(12) United States Patent
Matsuda

(10) Patent No.: US 9,218,124 B2
(45) Date of Patent: Dec. 22, 2015

(54) INFORMATION PROCESSING APPARATUS, INFORMATION PROCESSING METHOD, AND PROGRAM

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/026,964

(22) Filed: Feb. 14, 2011

(65) Prior Publication Data

US 2011/0210928 A1 Sep. 1, 2011

(30) Foreign Application Priority Data

Mar. 1, 2010 (JP) ................ P2010-044611

(51) Int. Cl.
*G06F 3/0488* (2013.01)
(52) U.S. Cl.
CPC ................. *G06F 3/04886* (2013.01)
(58) Field of Classification Search
CPC ..... G06F 3/041; G06F 3/0481; G06F 3/0488; G06F 3/04895; G06F 3/04897; G06F 3/0425; G06F 3/0426
USPC .............. 345/173–179; 178/18.01–18.09; 715/863
See application file for complete search history.

(56) References Cited

U.S. PATENT DOCUMENTS

2002/0163506 A1* 11/2002 Matusis ................. 345/173
2008/0163131 A1*  7/2008 Hirai et al. .............. 715/863

FOREIGN PATENT DOCUMENTS

JP 2001-134382 5/2001

* cited by examiner

*Primary Examiner* — Premal Patel
(74) *Attorney, Agent, or Firm* — Paratus Law Group, PLLC

(57) ABSTRACT

An information processing apparatus including: a detection section configured to detect the position of an object touching a touch-sensitive part as a touched position; a recognition section configured to recognize the type of a finger touching the touch-sensitive part based on the touched position and on an image of the touch-sensitive part; a search section configured to search through a function table defining correspondences between the touched position of at least one finger and the type thereof on the one hand and a function assigned to the combination of the touched position and the type of the finger on the other hand, the search section searching the function table for the function corresponding to the touched position detected by the detection section and to the finger type detected by the recognition section; and an execution section configured to execute the function detected through the search by the search section.

8 Claims, 23 Drawing Sheets

| TOUCHED POSITION | FINGER TYPE | FUNCTION | TEXT INCLUDED IN LABEL IMAGE |
|---|---|---|---|
| ON ICON | INDEX FINGER | EXECUTE | "EXECUTE" |
| | MIDDLE FINGER | DISPLAY MENU | "MENU" |
| | INDEX FINGER AND MIDDLE FINGER | COPY | "COPY" |

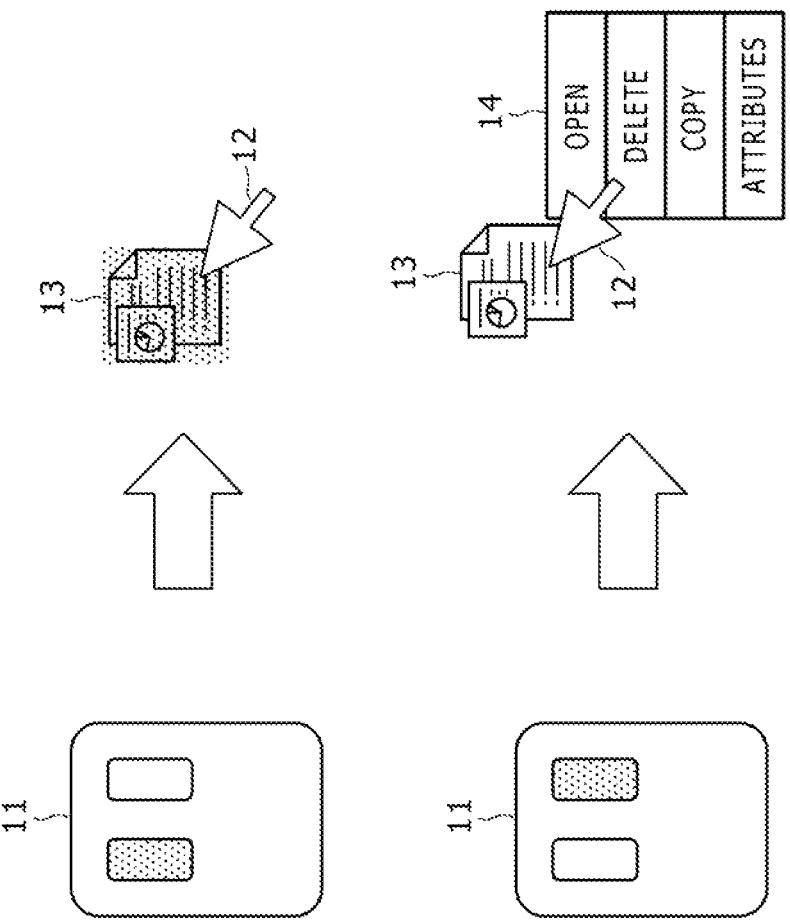

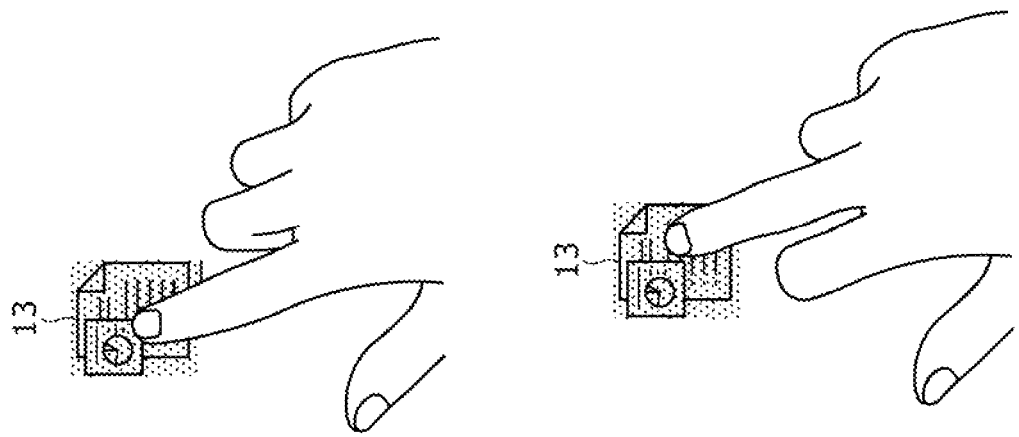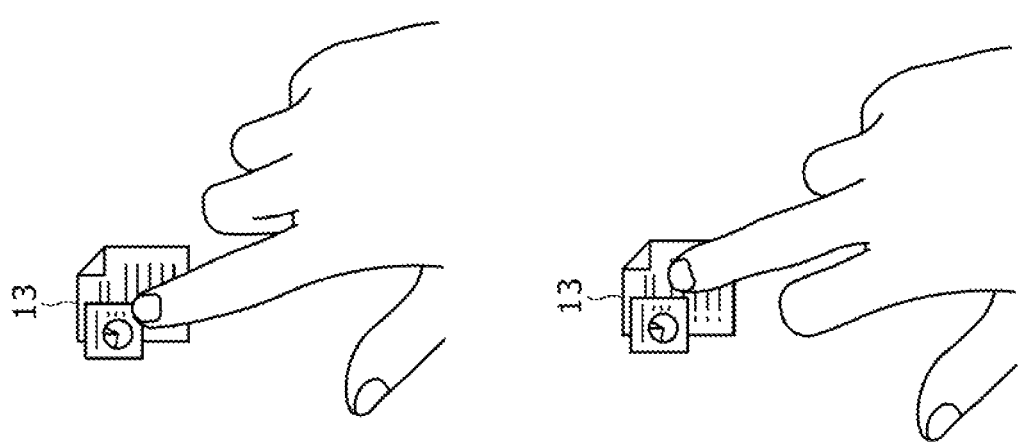
FIG. 2A
FIG. 2B

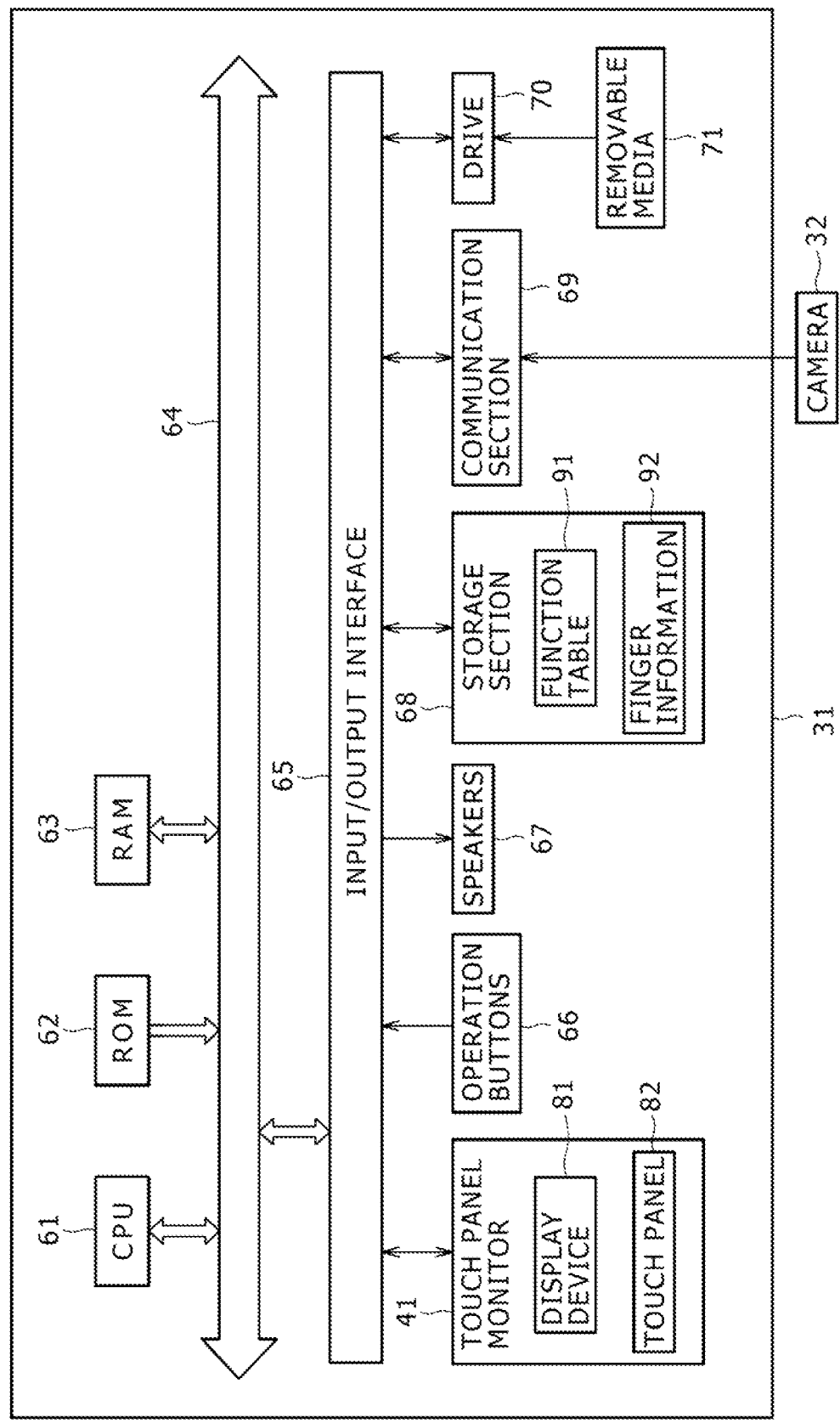

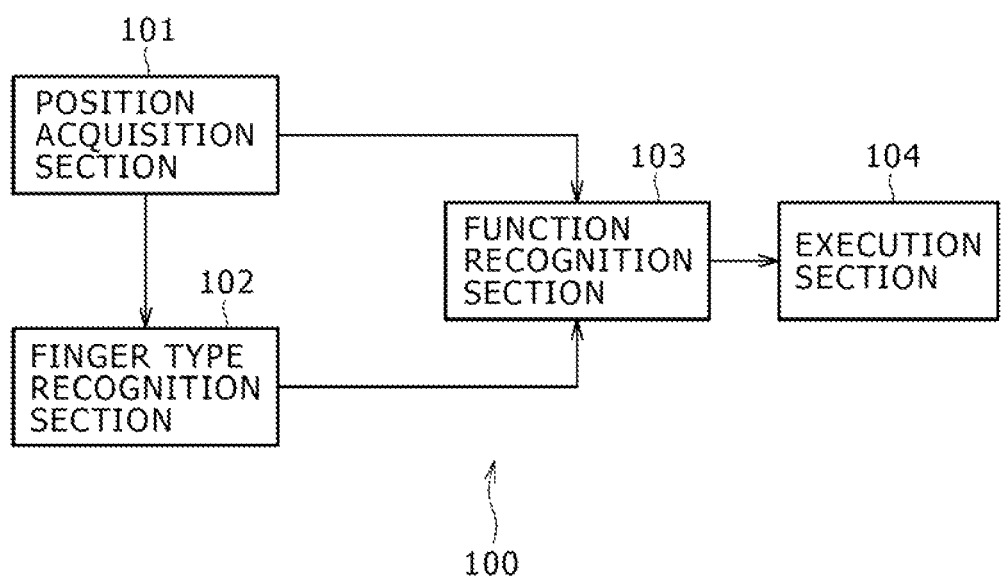

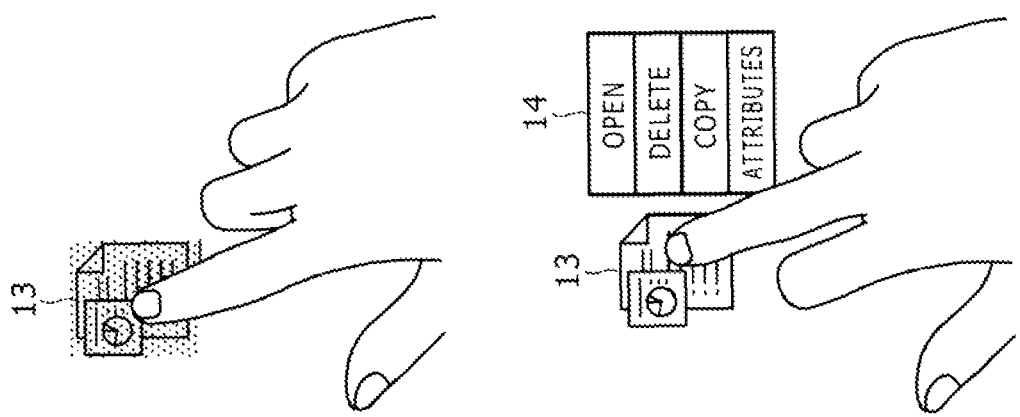
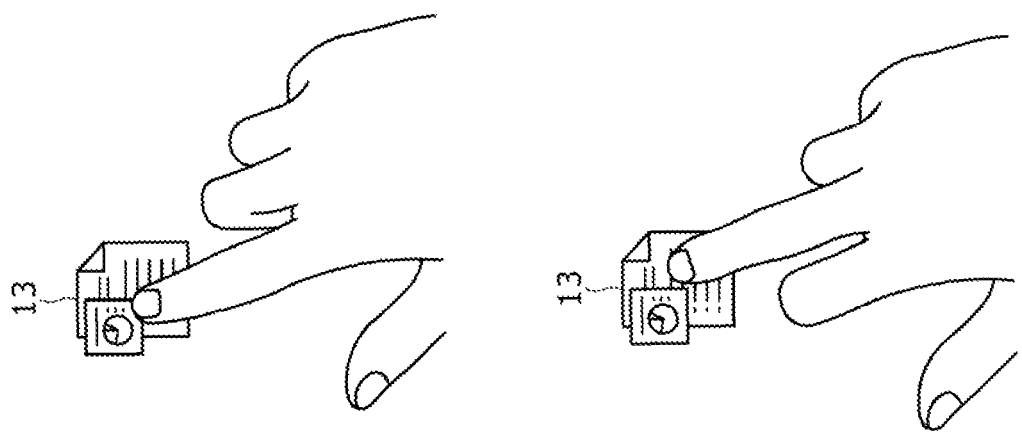
FIG. 8A
FIG. 8B

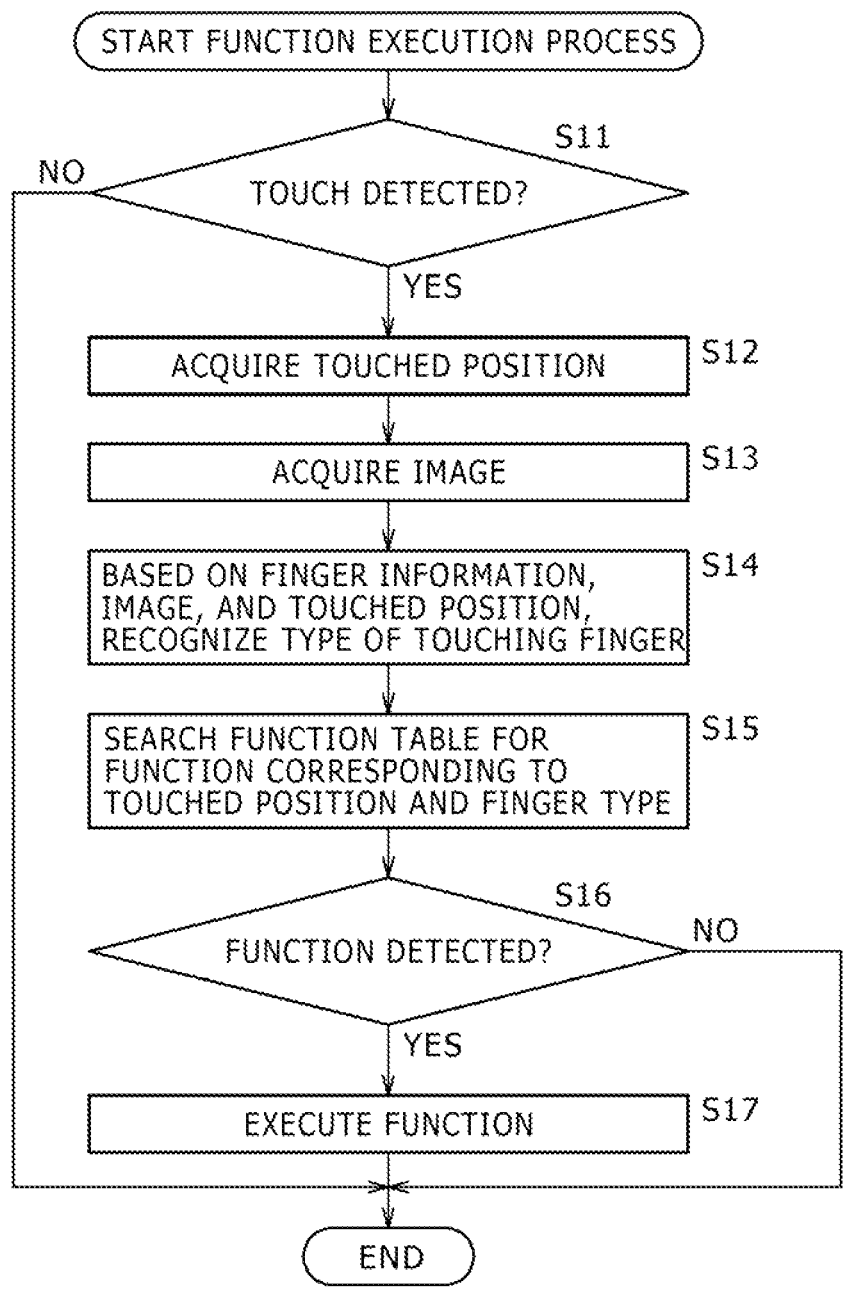

| TOUCHED POSITION | FINGER TYPE | FUNCTION | TEXT INCLUDED IN LABEL IMAGE |
|---|---|---|---|
| ON ICON | INDEX FINGER | EXECUTE | "EXECUTE" |
| | MIDDLE FINGER | DISPLAY MENU | "MENU" |
| | RING FINGER | COPY | "COPY" |
| | LITTLE FINGER | DISPLAY ATTRIBUTES | "ATTRIBUTES" |

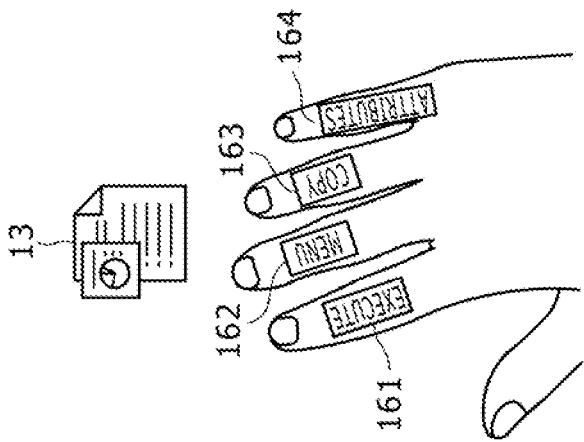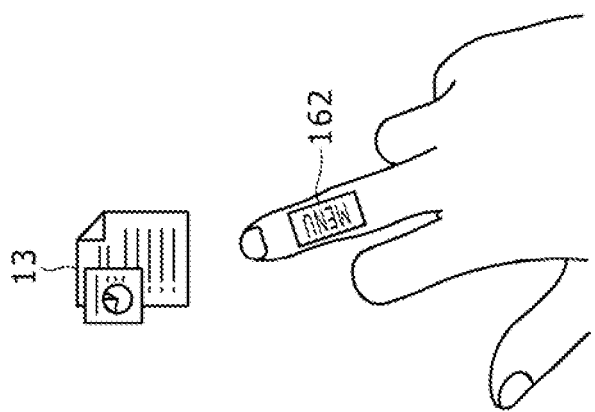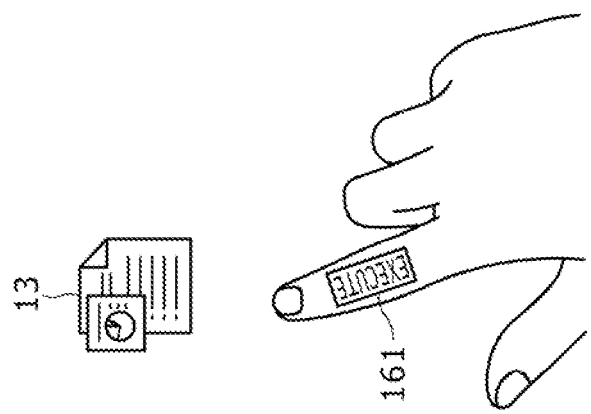

| TOUCHED POSITION | FINGER TYPE | FUNCTION | TEXT INCLUDED IN LABEL IMAGE |
|---|---|---|---|
| ON ICON | INDEX FINGER | EXECUTE | "EXECUTE" |
| | MIDDLE FINGER | DISPLAY MENU | "MENU" |
| | INDEX FINGER AND MIDDLE FINGER | COPY | "COPY" |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More particularly, the invention relates to an information processing apparatus that can be operated by touch to execute rapidly and easily the functions desired by a user; to an information processing method for use with such an information processing apparatus; and to a program implementing the functionality of such an information processing method.

2. Description of the Related Art

The information processing apparatus operable by mouse may have different functions assigned to each of so-called right-click and left-click operations performed on its mouse. These operations are each carried out by fingertips pressing, once and immediately releasing one of the right and the left buttons on the mouse.

With the above type of information processing apparatus in mind, suppose that a cursor 12 operable by a mouse 11 is displayed in the position of an icon 13 on a screen of the apparatus as shown in FIG. 1A. In this case, left-clicking the mouse 11 executes the function of selecting the icon 13. If the mouse 11 is right-clicked as shown in FIG. 1B, then the function of displaying a context menu 14 of the icon 13 is carried out. That is, two functions can be assigned to the position of the cursor 12 operated by the mouse 11.

Meanwhile, there exist information processing apparatuses that can be operated by touch with fingertips. One such apparatus typically utilizes a touch panel superposed on its display to detect the position and/or movement of an object touching the panel, thereby executing the functions assigned to that position and/or movement.

On the touch panel-equipped information processing apparatus, the user may touch once, say, that position on the touch panel which corresponds to the icon 13 with any one of his or her fingers as shown in FIG. 2A (index finger in this example). Then the function of selecting the icon 13 or the function of executing the corresponding to the icon 13 is carried out.

On the touch panel-equipped information processing apparatus, however, merely the position of the finger touching the touch panel is detected; the type of the touching finger is not detected. It follows that a plurality of functions cannot be assigned to a single touched position. As a result, whether the index finger touches the panel as shown in FIG. 2A or the middle finger touches it as indicated in FIG. 2B, the same function is executed as long as the touched position is the same.

If the position of the icon 13 is assigned the function corresponding to a left-click on a mouse-operable information processing apparatus, no function corresponding to a right-click can be assigned to the position of the icon 13. Thus if the user wants to execute the function of displaying a context menu 14 assigned to a right-click, it is necessary to perform complicated operations as shown in FIGS. 3A through 3C.

Specifically, if the user wants to execute the function of displaying the context menu 14, the user first touches that position on the touch panel which corresponds to the icon 13 with any one of his or her fingers (index finger in the example of FIGS. 3A through 3C) to execute the function of selecting the icon 13. After this, using any one of his or her fingers, the user touches that position on the touch panel which corresponds to an icon 21 to execute the function of displaying the context menu 14, as shown in FIG. 3B. As a result of this operation, the context menu 14 is displayed as shown in FIG. 3C. As described above, the user needs to touch the touch panel twice with fingertips in order to execute the function of displaying the context menu 14.

Given the above-described bottleneck, the need exists for a touch-operable information processing apparatus capable of having a plurality of functions assigned to the same touched position on the touch panel so as to carry out the functions desired by the user rapidly and easily.

Some touch-operable information processing apparatuses detect the number of the fingers touching the touch panel in order to carry out different functions depending on the number of the detected fingers (e.g., see Japanese Patent Laid-open No. 2001-134382).

SUMMARY OF THE INVENTION

None of the touch-operable information processing apparatuses disclosed so far, however, is designed to have different functions assigned to the same touched position depending on the type of the finger(s) so as to perform the functions desired by the user rapidly and easily.

The present invention has been made in view of the above circumstances and provides an information processing apparatus, among others, which can be operated by touch to execute the functions desired by the user in a rapid and easy manner.

In carrying out the present invention and according to one embodiment thereof, there is provided an information processing apparatus including: a detection unit for detecting the position of an object touching a touch-sensitive part as a touched position; a recognition unit for recognizing the type of a finger touching the touch-sensitive part based on the touched position and on an image of the touch-sensitive part; a search unit for searching through a function table defining correspondences between the touched position of at least one finger and the type thereof on the one hand and a function assigned to the combination of the touched position and the type of the finger on the other hand, the search unit searching the function table for the function corresponding to the touched position detected by the detection unit and to the finger type detected by the recognition unit; and an execution unit configured to execute the function detected through the search by the search unit.

An information processing apparatus and a program according to other embodiments of the present invention correspond to the inventive information processing apparatus outlined above.

According to the present invention embodied as depicted above, the position of an object touching a touch-sensitive part is first detected as a touched position. The type of a finger touching the touch-sensitive part is then recognized based on the touched position and on an image of the touch-sensitive part. A function table is provided to define correspondences between the touched position of at least one finger and the type thereof on the one hand and a function assigned to the combination of the touched position and the type of the finger on the other hand. The function table is searched for the function corresponding to the touched position detected and to the finger type detected. The function detected from the search is then executed.

When the present invention is implemented as outlined above, a touch-operable information processing apparatus can be made to execute the functions desired by the user rapidly and easily.

BRIEF DESCRIPTION OF THE DRAWINGS

FIGS. 1A and 1B are schematic views showing how a mouse is typically operated;

FIGS. 2A and 2B are schematic views showing how touch operations are usually performed;

FIG. 5 is a block diagram showing a typical hardware structure of an information processing apparatus included in FIG. 4;

FIG. 6 is a block diagram showing a typical functional structure of a function execution processing section implemented by a CPU included in the structure of FIG. 5;

FIG. 7 is a tabular view showing a typical function table;

FIGS. 8A and 8B are schematic views explanatory of typical functions executed when the function table of FIG. 7 is stored;

FIG. 9 is a flowchart explanatory of a function execution process performed by the function execution processing section shown in FIG. 6;

FIGS. 14A, 14B and 14C are schematic views showing typical images displayed on an HMD included in the structure of FIG. 11;

DETAILED DESCRIPTION OF THE PREFERRED EMBODIMENTS

First Embodiment

Figure 3A:
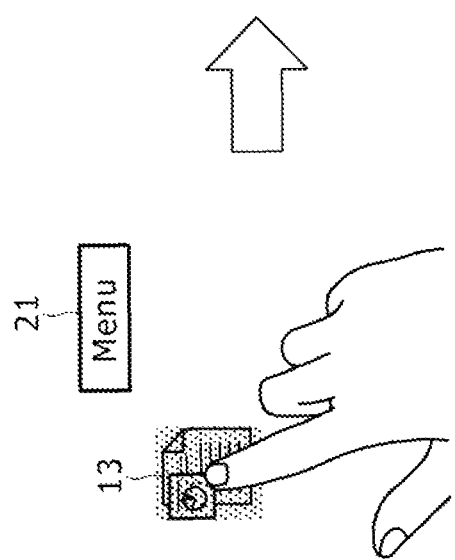
FIGS. 3A, 3B and 3C are schematic views showing how touch operations are typically performed to display a context menu.
Figure 3B:
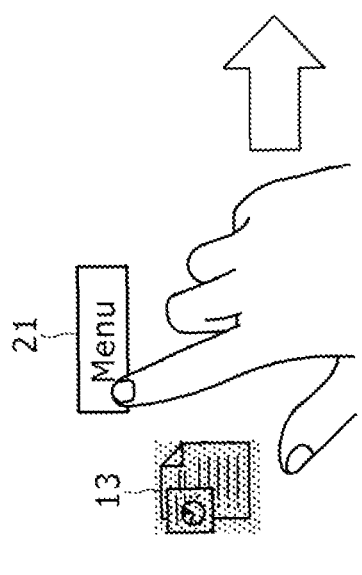
Figure 3C:
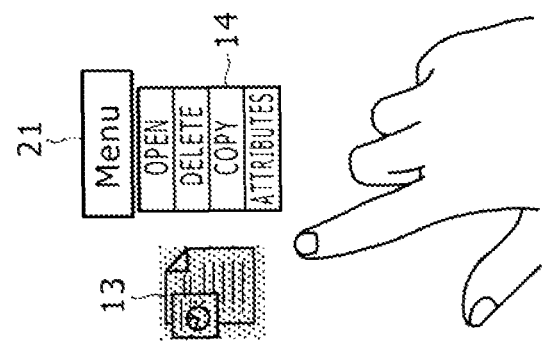
Figure 4:
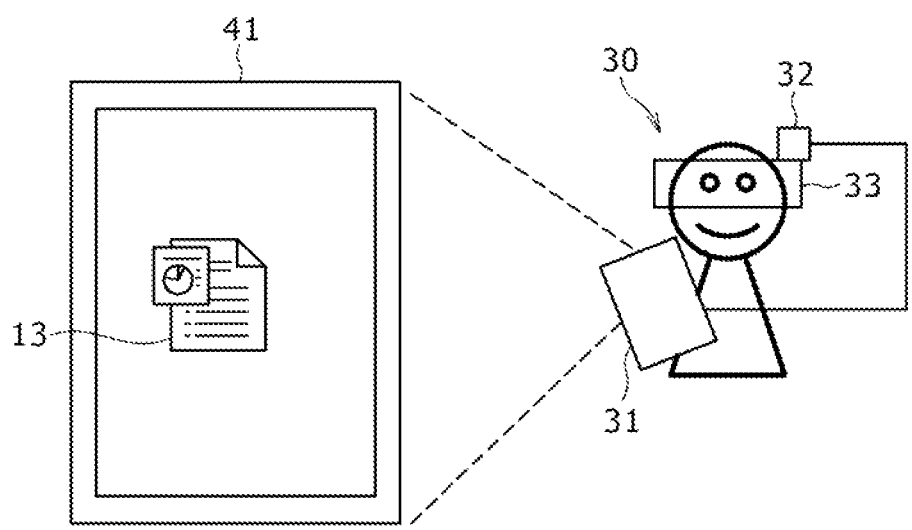
FIG. 4 is a schematic view showing a typical configuration of an information processing system as a first embodiment of the present invention.

Typical Configuration of the Information Processing System as the First Embodiment FIG. 4 is a schematic view showing a typical configuration of an information processing system as the first embodiment of the present invention.

As shown in FIG. 4, an information processing system 30 is made up of an information processing apparatus 31 and goggles 33 equipped with a camera 32. In FIG. 4, those parts already shown in FIGS. 1A through 3C are designated by the same reference numerals, and their descriptions will be omitted hereunder where redundant.

When making use of the information processing system 30, the user holds the information processing apparatus 31 and wears the goggles 33. The user performs touch operations on the information processing apparatus 31 while looking at the apparatus 31 through the goggles 33.

In the information processing system 30, the information processing apparatus 31 and the camera 32 are interconnected. The information processing apparatus 31 may be operated by touch with fingertips and is typically furnished with a touch panel monitor 41. The information processing apparatus 31 causes icons 13 or the like to appear on the touch panel monitor 41. The user gets the information processing apparatus 31 to execute desired functions by looking at the icons 13 or the like and by touching relevant positions on the panel with fingertips.

The camera 32 attached to the goggles 33 takes an image including the touch panel monitor 41. That unit the image thus taken includes a finger or fingers in contact with the touch panel monitor 41. The camera 32 transmits the acquired image to the information processing apparatus 31.

[Typical Hardware Structure of the Information Processing Apparatus]

FIG. 5 is a block diagram showing a typical hardware structure of the information processing apparatus included in FIG. 4.

As shown in FIG. 5, an information processing apparatus 31 incorporates a CPU, (central processing unit) 61. A ROM (read only memory) 62 and a RAM (random access memory) 63 are connected to the CPU 61 via a bus 64. Also, the CPU 61 is connected with the touch panel monitor 41, operation buttons 66, speakers 67, a storage section 68, a communication section 69, and a drive 70 by way of the bus 64 and an input/output Interface 65.

The CPU 61 executes programs preinstalled in the ROM 62 in accordance with operation information that comes from the operation buttons 66 representing the user's operations. Alternatively, the CPU 61 may load preinstalled programs from the storage section 68 into the RAM 63 for program execution. In this manner, the CPU 61 carries out processes as indicated in the flowcharts to be discussed later, or as depicted in the functional block diagrams, also to be described later. As needed, the CPU 61 outputs the result of its processing typically from the touch panel monitor 41 and/or the speakers 67 via the bus 64 and input/output interface 65, transmits the result through the communication section 69, or stores or otherwise holds the result in the storage section 68.

The touch panel monitor 41 (detection means) is typically made up of a display device 81 such as a CRT (cathode ray tube) or an LCD (liquid crystal display) and a colorless transparent touch panel 82 (contact means) disposed on the display device 81. The touch panel monitor 41 causes the display device 81 to display the icons 13 or the like as a result of the process performed by the CPU 61. The touch panel monitor 41 senses an object touching the touch panel 82 and feeds the CPU 61 with the location coming into contact with the object as the touched position.

The operation buttons 66 are physical buttons to be operated by the user. When operated by the user, the operation buttons 66 supply the operation information denoting the user's operations to the CPU 61. The speakers 67 output sounds representing the result of the process performed by the CPU 61.

The storage section 68 is typically composed of a hard disk drive (HDD) or the like. As such, the storage section 68 stores a function table 91, finger information 92 and other data. The function table 91 is a table that defines correspondences between the touched position and type of each finger on the one hand, and the function assigned to the combination of the touched position and the finger type in question on the other hand.

It is assumed that the thumb is not included in the fingers handling this embodiment. That is, this embodiment is for use with four fingers: index finger, middle finger, ring finger, and little finger. The finger information 92 is information that identifies each of the user's fingers. In this context, the finger information 92 is assumed to be an image of each of the user's fingers or information for identifying the shape of each finger. Typically, the finger information 92 is stored in advance by the user taking an image of each of his or her fingers using the camera 32.

The communication section 69 communicates with an external device such as the camera 32. For example, the communication section 69 receives images sent from the camera 32, and feeds the received images to the RAM 63 or elsewhere for storage purposes.

A piece of removable media 71 is attached to the drive 70 as needed. The drive 70 records data to the attached removable media 71 or reproduces the data recorded thereon. Typical removable media 71 include flexible disks, CD-ROMs (Compact Disc Read Only Memory), MO (magneto-optical) disks, DVDs (Digital Versatile Disc), magnetic disks, and semiconductor memories.

The programs to be executed by the CPU 61 may be stored (i.e., recorded) on the removable media 71. Such removable media 71 may be offered as so-called packaged software. In this case, the programs are installed into the information processing apparatus 31 via the drive 70.

Alternatively, the programs to be executed by the CPU 61 may be downloaded via communication or broadcast networks into the information processing apparatus 31 and installed into the storage section 68 inside. For example, the programs may be transferred from download sites to the information processing apparatus 31 wirelessly via a digital broadcast satellite or in wired fashion by way of networks such as LAN (Local Area Network) and the Internet.

[Typical Functional Structure of the Information Processing Apparatus]

FIG. 6 is a block diagram showing a typical functional structure of a function execution processing section implemented by the CPU 61 of the information processing apparatus 31.

As shown in FIG. 6, a function execution processing section 100 is made up of a position acquisition section 101, a finger type recognition section 102 (recognition means), a function recognition section 103 (search means), and an execution section 104 (execution means). In response to a touch with fingertips on the touch panel 82, the function execution processing section 100 executes the function assigned to the position on the panel of the touching finger and to the type thereof.

More specifically, the position acquisition section 101 of the function execution processing section 100 acquires the touched position (e.g., on an icon) fed from the touch panel monitor 41. The position acquisition section 101 supplies the touched position thus acquired to the finger type recognition section 102 and function recognition section 103.

Based on the image sent from the camera 32, on the finger information 92 stored beforehand in the storage section 68, and on the touched position from the position acquisition section 101, the finger type recognition section 102 recognizes the type of the finger touching the touch panel 82. More specifically, if the image of each finger is stored as the finger information 92, the finger type recognition section 102 matches the finger information 92 against surroundings of the touched position in the image sent from the camera 32 so as to recognize the type of the finger included in the image from the camera 32. The finger type recognition section 102 proceeds to supply the recognized finger type (e.g., index finger) to the function recognition section 103.

For example, the method of recognizing the finger type may be adapted from the technique discussed by Taehee Lee and Tobias Hollerer in "Handy AR: Markerless Inspection of Augmented Reality Objects Using Fingertip Tracking," In Proc. IEEE International Symposium on Wearable Computers (ISWC), Boston, Mass., October 2007.

The function recognition section 103 searches the function table 91 stored beforehand in the storage section 68, for the function corresponding to the touched position supplied from the position acquisition section 102 as well to the finger type from the finger type recognition section 102. The function recognition section 103 recognizes the function thus detected from the search as the function to be executed, and sends information representing the function to the execution section 104.

The execution section 104 executes the function represented by the information fed from the function recognition section 103.

[Explanation of the Effects]

FIG. 7 is a tabular view showing an example of the function table 91. FIGS. 8A and 8B are schematic views explanatory of typical functions executed when the function table 91 in FIG. 7 is stored in the storage section 68.

As shown in FIG. 7, the function table 91 defines correspondences between the touched position and the type of each finger on the one hand and the function assigned to the combination of the touched position and the finger type on the other hand. In the example of FIG. 7, a correspondence is established between the touched position "on icon" and the finger type "index finger" on the one hand, and the function "execute" on the other hand. In the same example, a correspondence is also established between the touched position "on icon" and the finger type "middle finger" on the one hand and the function "display menu" on the other hand.

Thus as shown in FIG. 8A, when the user with his or her index finger touches that position on the touch panel 82 which corresponds to the display position of the icon 13, the function of executing the application corresponding to the icon 13 is performed. And as shown in FIG. 8B, when the user with his or her middle finger touches that position on the touch panel 82 which corresponds to the display position of the icon 13, the function of displaying the context menu 14 is carried out.

That is, where the function table 91 shown in FIG. 7 is stored in the storage section 68, the function to be executed differs depending on whether the index finger or the middle finger is used to touch the same position on the touch panel 82 which corresponds to the icon 13. In FIGS. 8A and 8B, those parts already shown in FIGS. 1A through 3C are designated by the same reference numerals, and their descriptions will be omitted hereunder where redundant.

In the information processing system 30, as described above, the touch panel monitor 41 detects the position of the object touching the touch panel 82. Based on the touched position and on the image of the touch panel 82, the finger type recognition section 102 recognizes the type of the finger touching the touch panel 82. The function table 91 is provided to define correspondences between the touched position and the type of each finger on the one hand and the function assigned to the combination of the touched position and the finger type on the other hand. The function recognition section 103 searches the function table 91 for the function corresponding to the touched position thus detected and to the finger type thus recognized. The execution section 104 executes the function detected from the search.

Thus even when the same position on the touch panel 82 is touched with fingertips, a different function is executed depending on the type of the finger. As a result, it is possible to increase the number of functions that can be executed with a single action involving a finger touching a relevant position on the panel. This permits rapid and easy execution of the functions desired by the user.

[Explanation of the Process Performed by the Information Processing Apparatus]

FIG. 9 is a flowchart explanatory of the function execution process performed by the function execution processing section 100.

In step S11 of FIG. 9, the position acquisition section 101 determines whether a touch of an object on the touch panel 82 is detected, i.e., whether any touched position is supplied from the touch panel monitor 41.

If it is determined in step S11 that a touch of an object on the touch panel 82 is detected, then step S12 is reached. In step S12, the position acquisition section 101 acquires the touched position from the touch panel monitor 41, and feeds the touched position thus acquired to the finger type recognition section 102 and function recognition section 103.

In step S13, the finger type recognition section 102 acquires an image sent from the camera 32.

In step S14, the finger type recognition section 102 recognizes the type of the finger touching the touch panel 82 based on the finger information 92 stored beforehand in the storage section 68, on the image obtained from the camera 32, and on the touched position from the position acquisition section 101. The finger type acquisition section 102 sends the finger type thus recognized to the function recognition section 103.

In step S15, the function recognition section 103 searches the function table 91 stored beforehand in the storage section 68, for the function corresponding to the touched position fed from the position acquisition section 101 and to the finger type from the finger type recognition section 102.

In step S16, the function recognition section 103 determines whether the function corresponding to the touched position fed from the position acquisition section 101 and to the finger type from the finger type recognition section 102 has been detected from the search. If it is determined in step S16 that the function has been detected, the function recognition section 103 recognizes the detected function as the function to be executed, and supplies the execution section 104 with information representative of that function. Control is then transferred to step S17.

In step S17, the execution section 104 executes the function whose information has been fed from the function recognition section 103. This brings the function execution process to an end.

If it is determined in step S11 that a touch of an object on the touch panel 82 has yet to be detected, or if it is determined in step S16 that the corresponding function is not found, then the function execution process is terminated.

Steps S15 through S17 in FIG. 9 are carried out with regard to each of the finger types recognized in step S14.

Second Embodiment

Figure 10:
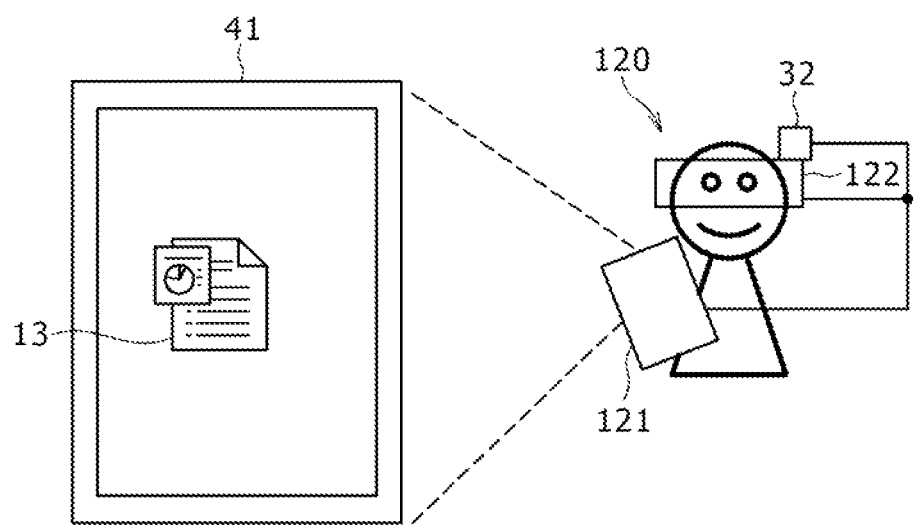
FIG. 10 is a schematic view showing a typical configuration of an information processing system as a second embodiment of the present invention.

Typical Configuration of the Information Processing System as the Second Embodiment FIG. 10 is a schematic view showing a typical configuration of an information processing system as the second embodiment of the present invention.

In FIG. 10, those components already shown in FIG. 4 are designated by the same reference numerals, and their descriptions will be omitted hereunder where redundant.

The configuration of an information processing system 120 in FIG. 10 is different from that of the information processing system 30 in FIG. 4 primarily on the following two points: that the information processing apparatus 31 is replaced by an information processing apparatus 121, and that the goggles 33 are replaced by a head mount display (HMD) 122.

When making use of the information processing system 120, the user holds the information processing apparatus 121 and wears the HMD 122. The user does not look directly at the information processing apparatus 121. Instead, the user performs touch operations on the information processing apparatus 121 while watching those images of the apparatus 121 which are taken by the camera 32 and which are displayed on the HMD 122.

In the information processing system 120, the information processing apparatus 121 is connected not only to the camera 32 but also to the HMD 122. As with the information processing apparatus 31 in FIG. 4, the information processing apparatus 121 can be operated by touch with fingertips and is furnished with the touch panel monitor 41 or the like. And like the information, processing apparatus 31 in FIG. 4, the information processing apparatus 121 causes the touch panel monitor 41 to display icons 13 or the like.

Also, based on the image taken by and sent from the camera 32, the information processing apparatus 121 recognizes the function to be executed when the finger included in the image touches the surroundings of the current position on the touch panel monitor 41, and superposes a label image representing that function onto the image of the finger. The information processing apparatus 121 transmits the resulting image to the HMD 122 and causes the latter to display the image.

The user touches the relevant position on the panel with his or her finger while viewing the icon 13, label image and the like displayed on the touch panel monitor 41. The touch operation causes the information processing apparatus 121 to execute the desired function.

The HMD 122 is connected to the information processing apparatus 121. The HMD 122 displays the images sent from the information processing apparatus 121.

[Typical Hardware Structure, of the Information Processing Apparatus]

Figure 11:
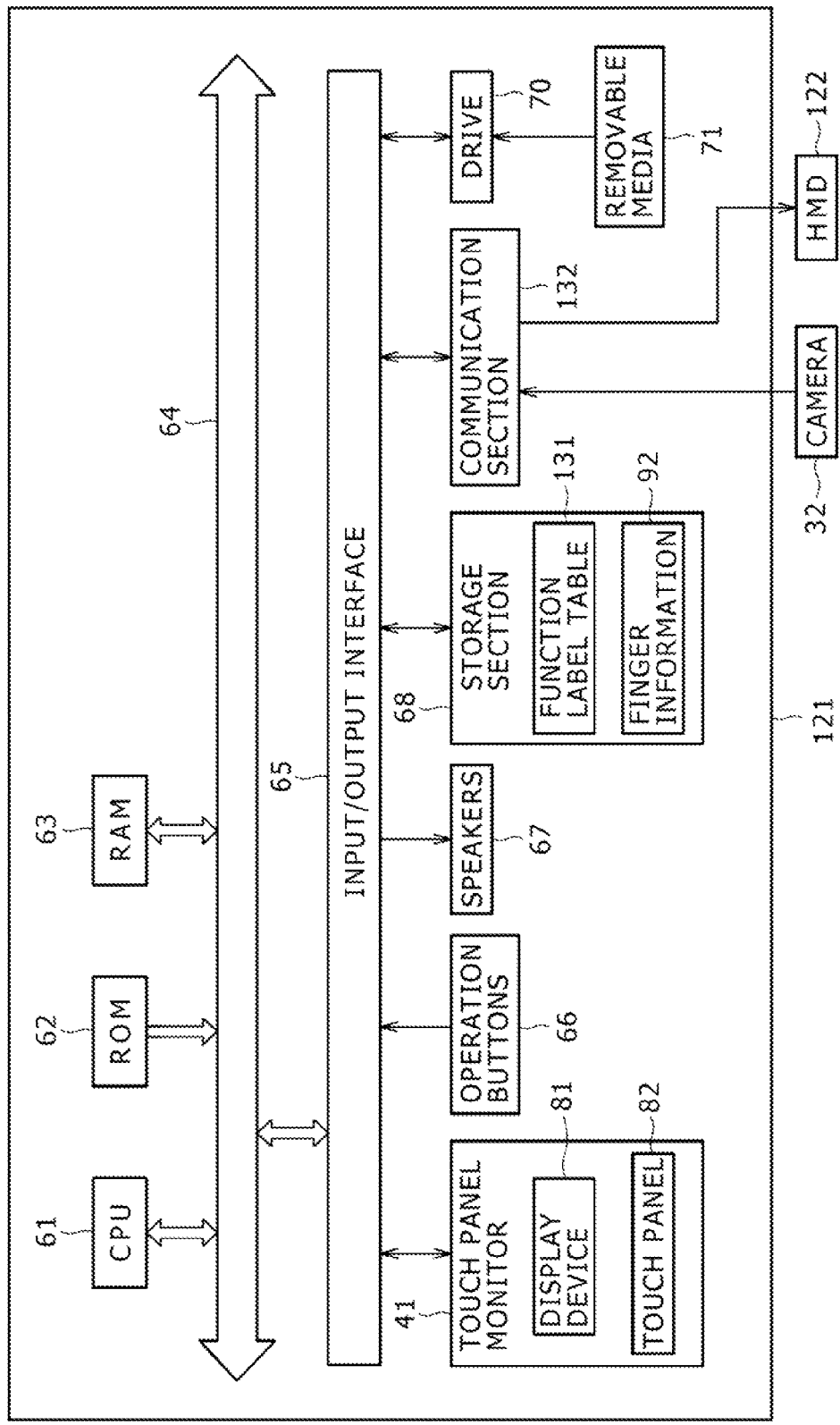
FIG. 11 is a block diagram showing a typical hardware structure of an information processing apparatus included in FIG. 10.

FIG. 11 is a block diagram showing a typical hardware structure of the information processing apparatus 121 in FIG. 10.

In FIG. 11, those components already shown in FIG. 5 are designated by the same reference numerals, and their descriptions will be omitted hereunder where redundant.

The structure of the information processing apparatus 121 in FIG. 11 is different from that in FIG. 5 primarily on the following two points: that the function table 91 is replaced by a function label table 131 in the storage section 68, and that the communication section 69 is replaced by a communication section 132.

The function label table 131 defines correspondences among the touched position and type of each finger, the function assigned to the combination of the touched position and type of the finger in question, and text (function information) included in the label image representing that function.

The communication section 132 communicates with external devices such as the camera 32 and HMD 122. For example, the communication section 132 receives images sent from the camera 32 and forwards the received images to the RAM 63 or the like for storage. Also, the communication section 132 receives from the CPU 61 the images that are sent from the camera 32 or images each superposed with a label image, and sends the received images to the HMD 122 for display.

[Typical Functional Structure of the Information Processing Apparatus]

Figures 12, 13:
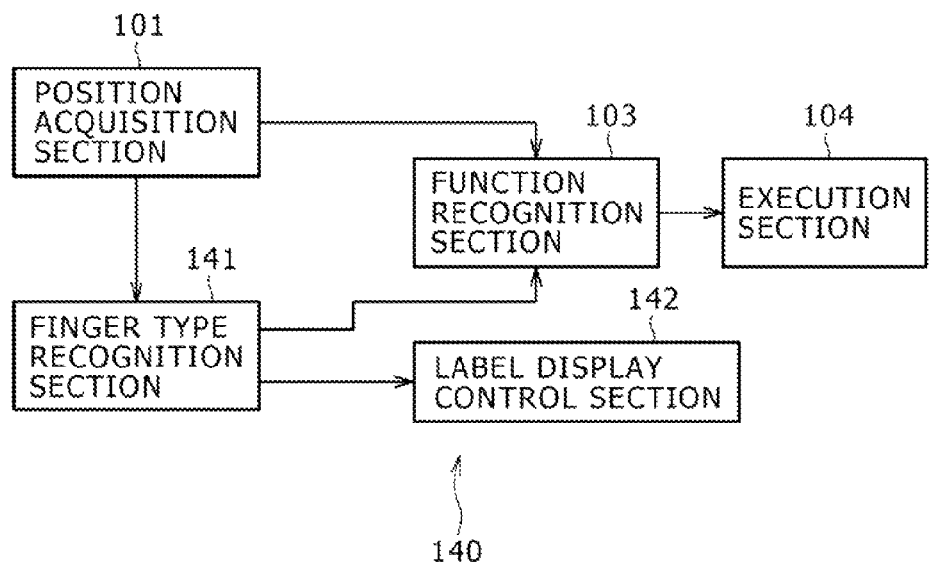
FIG. 12 is a block diagram showing a typical functional structure of a function execution processing section implemented by a CPU included in the structure of FIG. 11.
FIG. 13 is a tabular view showing a typical function label table included in the structure of FIG. 11.

FIG. 12 is a block diagram showing a typical functional structure of a function execution processing section implemented by the CPU 61 of the information processing apparatus 121 FIG. 11.

In FIG. 12, those components already shown in FIG. 6 are designated by the same reference numerals, and their descriptions will be omitted hereunder where redundant.

The structure of a function execution processing section 140 in FIG. 12 is different from that in FIG. 6 primarily on the following two points: that the finger type recognition section 102 is replaced by a finger type recognition section 141 (recognition means) and that a label display control section 142 (display control means) is provided anew.

Based on the image sent from the camera 32 and on the finger information 92 stored beforehand in the storage section 68, the finger type recognition section 141 of the function execution processing section 140 recognizes the type and position of the finger included in the image. That is, on the basis of the image from the camera 32 and of the finger information 92, the finger type recognition section 141 recognizes the type and position of the finger disposed on the touch panel monitor 41. The finger type recognition section 141 then supplies the recognized finger type and finger position to the label display control section 142.

As with the finger type recognition section 102, the finger type recognition section 141 recognizes the type of the finger touching the touch panel 82 based on the image sent from the camera 32, on the finger information 92, and on the touched position from the position acquisition section 101.

If the type and position of the finger disposed on the touch panel monitor 41 are recognized beforehand, the finger type recognition section 141 may be arranged to recognize the type of the finger touching the touch panel 82 by use of the previously recognized finger type and its position. In this case, the finger type recognition section 141 recognizes, from among the previously recognized types of the fingers disposed on the touch panel monitor 41, the type of the finger corresponding to the touched position from the position acquisition section 101 as the type of the finger touching the touch panel 82.

The finger type recognition section 141 supplies the function recognition section 103 with the type of the finger disposed on the touch panel monitor 41.

The label display control section 142 searches the function label table 131 stored beforehand in the storage section 68, for text included in a label image corresponding to the surroundings of the finger position and to the finger type fed from the finger type recognition section 141. With the text detected, the label display control section 142 generates a label image of the detected text. The label display control section 142 superposes the label image corresponding to the finger position and finger type onto the finger position of the image sent from the camera 32 and forwarded via the finger type recognition section 141. The label display control section 142 proceeds to control the communication section 132 to transmit the image obtained through the superposing to the HMD 122 for display.

[Typical Function Label Table]

FIG. 13 is a tabular view showing a typical function label table 131.

As shown in FIG. 13, the function label table 131 defines correspondences among the touched position and type of each finger, the function assigned to the combination of the touched position and type of the finger in question, and text included in the label image representing that function.

More specifically, in the example of FIG. 13, a correspondence is established among the touched position of the finger "on icon," the finger type "index finger," the function "execute," and text "EXECUTE" included in the label image. Also, a correspondence is established among the touched position of the finger "on icon," the finger type "middle finger," the function "display menu," and the text "MENU" included in the label image.

Furthermore, a correspondence is established among the touched position of the finger "on icon," the finger type "ring finger," the function "copy," and text "COPY" included in the label image. And a correspondence is established among the touched position of the finger "on icon," the finger type "little finger," the function "display attributes," and the text "ATTRIBUTES" included in the label image.

[Typical Images Displayed on the HMD]

FIGS. 14A, 14B and 14C are schematic views showing typical images displayed on the HMD 122 by, the information processing apparatus 121 in FIG. 11.

For the example shown in FIGS. 14A through 14C, it is assumed that the function label table 131 indicated in FIG. 13 is stored in the storage section 68.

When the user disposes his or her index finger onto the surroundings of the icon 13 as shown in FIG. 14A, the camera 32 takes an image including the index finger. The function label table 131 is then searched for the text "EXECUTE" included in the label image corresponding to the index finger and to the top of the icon 13 representative of the surroundings of the index finger's position. The HMD 122 is caused to display an image in which a label image 161 including the text "EXECUTE" is superposed onto the position of the index finger.

Also, when the user disposes his or her middle finger onto the surroundings of the icon 13 as shown in FIG. 14B, the camera 32 takes an image including the middle finger. The function label table 131 is then searched for the text "MENU" included in the label image corresponding to the middle finger and to the top of the icon 13 representative of the surroundings of the middle finger's position. The HMD 122 is caused to display an image in which a label image 162 including the text "MENU" is superposed onto the position of the middle finger.

Furthermore, when the user disposes all his or her fingers onto the surroundings of the icon 13 as shown in FIG. 14C, the camera 32 takes an image including all the fingers. The function label table 131 is then searched for the text included in the label image corresponding to all the fingers and to the top of the icon 13 representative of the surroundings of all the fingers' positions. As a result, as shown in FIG. 14C, the HMD 122 is caused to display an image in which the label image 161 including the text "EXECUTE," the label image 162 including the text "MENU," a label image 163 including the text "COPY," and a label image 164 including the text "ATTRIBUTES" are superposed respectively onto the positions of the index finger, middle finger, ring finger, and little finger.

As described, the information processing system 120 causes the HMD 122 to display the label image representing the function executed when a given finger disposed on the touch panel monitor 41 touches the surroundings of the current position, the label image being superposed onto the finger's position in the image including the touch panel monitor 41. Thus by disposing a desired finger on the relevant position of the touch panel monitor 41, the user can readily recognize the function to be executed when that finger touches the surroundings of that position on the monitor. Consequently the user can perform the desired function even when unfamiliar with the functions assigned to the combinations of the various fingers and their types. In this manner, the information processing system 120 allows the user to perform appreciably simpler touch operations when making use of desired functionality.

[Explanation of a Typical Process Performed by the Information Processing Apparatus]

Figure 15:
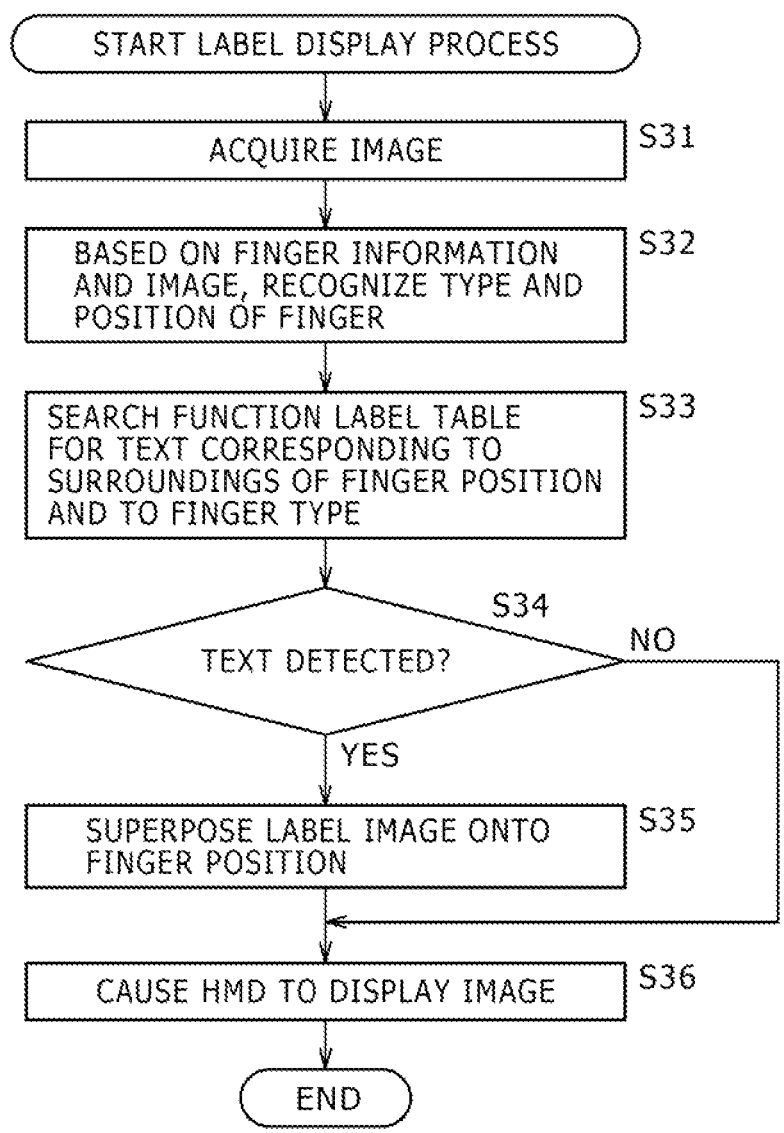
FIG. 15 is a flowchart explanatory of a label display process performed by the function execution processing section of FIG. 12.

FIG. 15 is a flowchart explanatory of the label display process performed by the function execution processing section 140.

In step S31, the finger type recognition section 141 acquires the image taken by and sent from the camera 32.

In step S32, based on the finger information 92 stored beforehand in the storage section 68 and on the image acquired from the camera 32, the finger type recognition section 141 recognizes the type and position of the finger included in the image. The finger type recognition section 141 supplies the finger type and finger position thus recognized to the label display control section 142.

In step S33, the label display control section 142 searches the function label table 131 stored beforehand in the storage section 68, for the text included in the image fed from the finger type recognition section 141 and corresponding to the surroundings of the finger position and to the finger type.

In step S34, the label display control section 142 determines whether the text included in the image coming from the finger type recognition section 141 and corresponding to the surroundings of the finger position and to the finger type has been detected from the search.

If it is determined in step S34 that the relevant text has been detected, then the label display control section 142 generates a label image including the detected text, and transfers control to step S35.

In step S35, the label display control section 142 superposes the label image generated in step S33 onto the finger position fed from the function recognition section 103 in the image sent from the camera 32. Control is then transferred to step S36.

If in step S34 it is determined that the text is not detected, then no label image is superposed onto the image taken by the camera 32. In this case, control is transferred to step S36.

Steps S33 through S36 in FIG. 15 are carried out with regard to each of the finger types recognized in step S32.

In step S36, the label display control section 142 controls the communication section 132 to transmit either the image which was sent from the camera 32 and on which the label image was not superposed in the above steps, or the image which came from the camera 32 and onto which the label image has been superposed, to the HMD 122 for display. This step brings the label display process to an end.

The function execution process performed by the function execution processing section 140 is the same as the process explained above in reference to FIG. 9 and thus will not be discussed further.

(Another Typical Hardware Structure of the Information Processing Apparatus)

Figure 16:
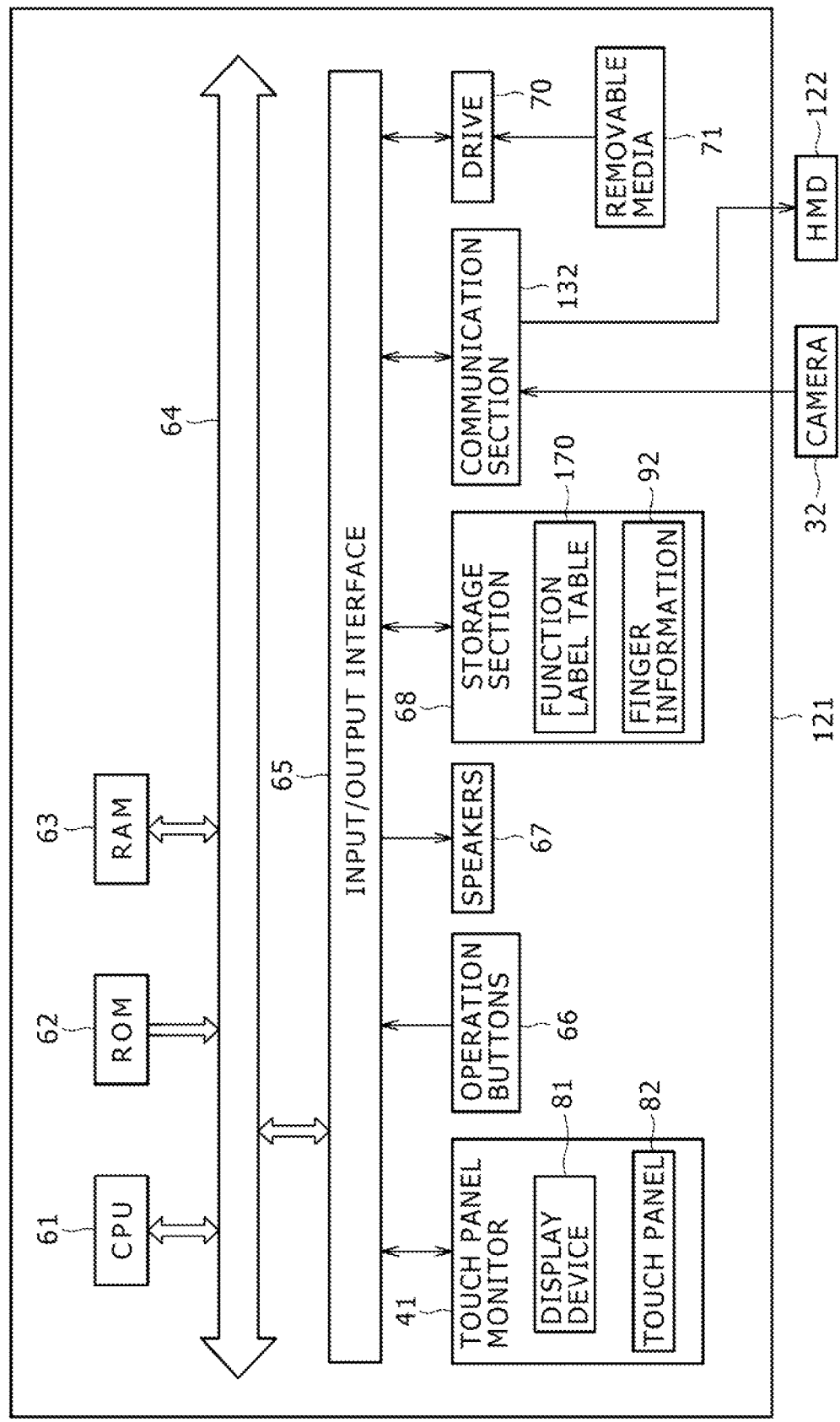
FIG. 16 is a block diagram showing another typical hardware structure of the information processing apparatus in FIG. 10.

FIG. 16 is a block diagram showing another typical hardware structure of the information processing apparatus 121 in FIG. 10.

In FIG. 16, those components already shown in FIG. 11 are designated by the same reference numerals, and their descriptions will be omitted hereunder where redundant.

The structure of the information processing apparatus 121 in FIG. 16 is different from that in FIG. 11 primarily on the following point: that the function label table 131 is replaced by a function label table 170 in the storage section 68.

In the information processing apparatus 121 of FIG. 16, functions are assigned not only to the combination of the touched position and type of each finger but also to the combination of the touched positions and types of a plurality of fingers.

More specifically, the function label table 170 defines correspondences among the touched positions and types of one or more fingers, the function assigned to the combination of the touched positions and types of these fingers, and text included in a label image representing that function.

[Typical Functional Structure of the Information Processing Apparatus]

Figures 17, 18:
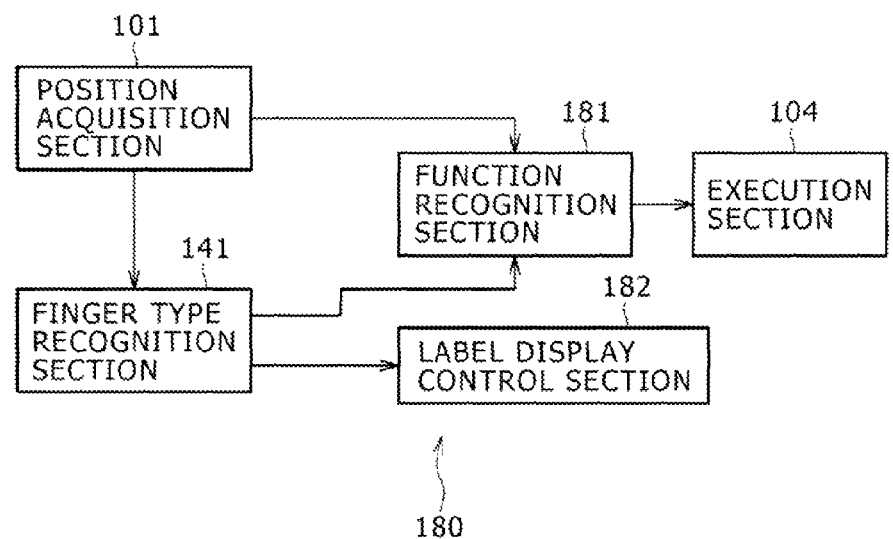
FIG. 17 is a block diagram showing a typical functional structure of a function execution processing section implemented by a CPU included in the structure of FIG. 16.
FIG. 18 is tabular view showing a typical function label table included in the structure of FIG. 16.

FIG. 17 is a block diagram showing a typical functional structure of a function execution processing section 180 implemented by the CPU 61 of the information processing apparatus 121 in FIG. 16.

In FIG. 17, those components already shown in FIG. 12 are designated by the same reference numerals, and their descriptions will be omitted hereunder where redundant.

The structure of the information processing apparatus 180 in FIG. 17 is different from that in FIG. 12 primarily on the following two points: that the function recognition section 103 is replaced by a function recognition section 181, and that the label display control section 142 is replaced by a label display control section 182.

When supplied with the touched positions of a plurality of fingers from the position acquisition section 101, the function recognition section 181 of the function execution processing section 180 calculates the distance between each two contiguous fingers based on the touched positions and on the finger types fed from the finger type recognition section 141. As with the label display control section 182 to be discussed later, the function recognition section 181 determines whether the plurality of fingers are joined on the basis of the calculated distances.

When a plurality of fingers touching the touch panel 82 are found joined with one another, the function recognition section 181 searches the function label table 170 for the function corresponding to the positions and types of these multiple fingers. If one or more fingers touching the touch panel 82 are separated from the other fingers, the function recognition section 181 searches the function label table 170 for the function corresponding to the positions and types of the separated fingers. The function recognition section 181 recognizes the function detected from the search as the function to be executed, and sends information representing that function to the execution section 104.

When supplied with the positions and types of a plurality of fingers from the finger type recognition section 141, the label display control section 182 calculates the distance between each two contiguous fingers based on the positions and types of these fingers. Based on the distances thus calculated, the label display control section 182 determines whether the plurality of fingers are joined with one another. If the plurality of fingers are disposed on the touch panel 82 in a manner joined with one another, the label display control section 182 searches the function label table 170 for the text included in the label image corresponding to the positions and types of these fingers. If one or more fingers are disposed on the touch panel 82 in a manner separated from the other fingers, the label display control section 182 searches the function label table 170 for the text included in the label image corresponding to the positions and types of the separated fingers. The label display control section 182 proceeds to generate the label image including the text detected from the search.

The label display control section 182 superposes the label image of the function corresponding to the positions and types of the multiple joined fingers onto one position, in the image sent from the camera 32, corresponding to the positions of these fingers supplied from the finger type recognition section 141. Also, the label display control section 182 superposes the label image of the function corresponding to the positions and types of one or more fingers separated from the other fingers, onto the position, in the image sent from the camera 32, of the one or more separated fingers supplied from the finger type recognition section 141. The label display control section 182 then controls the communication section 132 to transmit the image resulting from the superposing to the HMD 122 for display.

[Typical Function Label Table]

FIG. 18 is tabular view showing a typical function label table 170.

As shown in FIG. 18, the function label table 170 defines correspondences among the touched position and type of at least one finger, the function assigned to the combination of the touched position of the finger and its type, and text included in the label image representing that function.

More specifically, in the example of FIG. 18, a correspondence is established among the touched position of the finger "on icon," the finger type "index finger," the function "execute," and the text "EXECUTE" included in the label image. Also, a correspondence is established among the touched position of the finger "on icon," the finger type "middle finger," the function "display menu," and the text "MENU" included in the label image.

Furthermore, a correspondence is established among the touched position of the finger "on icon," the finger type "index finger and middle finger," the function "copy," and the text "COPY" included in the label image.

[Typical Images Displayed on the HMD]

Figure 19A:
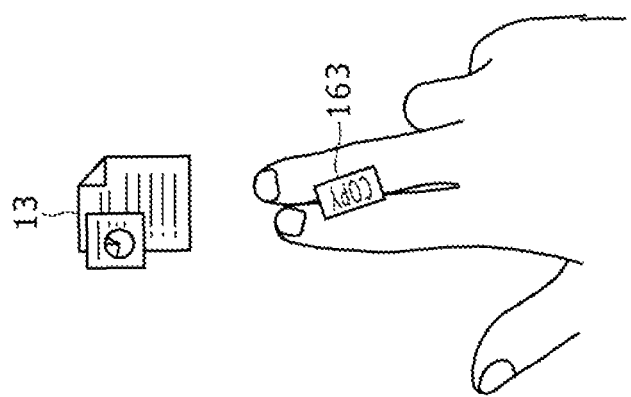
FIGS. 19A and 19B are schematic views showing typical images displayed on an HMD included in the structure of FIG. 16.
Figure 19B:
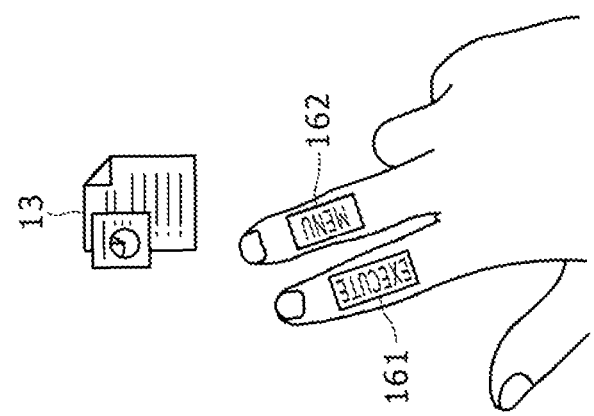

FIGS. 19A and 19B are schematic views showing typical images displayed on the HMD 122 by the information processing apparatus 121 in FIG. 16.

For the example in FIGS. 19A and 19B, it is assumed that the function label table 170 shown in FIG. 18 is stored in the storage section 68. Also in FIGS. 19A and 19B, those parts already shown in FIGS. 14A through 14C are designated by the same reference numerals, and their descriptions will be omitted hereunder where redundant.

When the user places his or her index finger and middle finger separated from each other onto the surroundings of the icon 13 as shown in FIG. 19A, the camera 32 takes an image including the separated index finger and middle finger. The function label table 170 is then searched for the text "EXECUTE" included in the label image corresponding to the index finger and to the icon 13 of which the surroundings are being touched by the index finger. The function label table 170 is also searched for the text "MENU" included in the label image corresponding to the middle finger and to the icon 13 of which the surroundings are being touched by the middle finger. The HMD 122 is then caused to display an image in which the label image 161 including the text "EXECUTE" is superposed onto the position of the index finger and in which the label image 162 including the character "MENU" is superposed onto the position of the middle finger.

Also, when the user places his or her index finger and middle finger joined with each other onto the surroundings of the icon 13 as shown in FIG. 19B, the camera 32 takes an image including the joined index finger and middle finger. The function label table 170 is searched for the text "COPY" included in the label image corresponding to the index finger and middle finger and to the icon 13 of which the surroundings are being touched by the index finger and middle finger. The HMD 122 is then caused to display an image in which the label image 163 including the text "COPY" is superposed onto one position corresponding to the joined index finger and middle finger (e.g., onto the midpoint between the index finger and the middle finger in the example of FIGS. 19A and 19B).

[Explanation of a Typical Process Performed by the Information Processing Apparatus]

Figure 20:
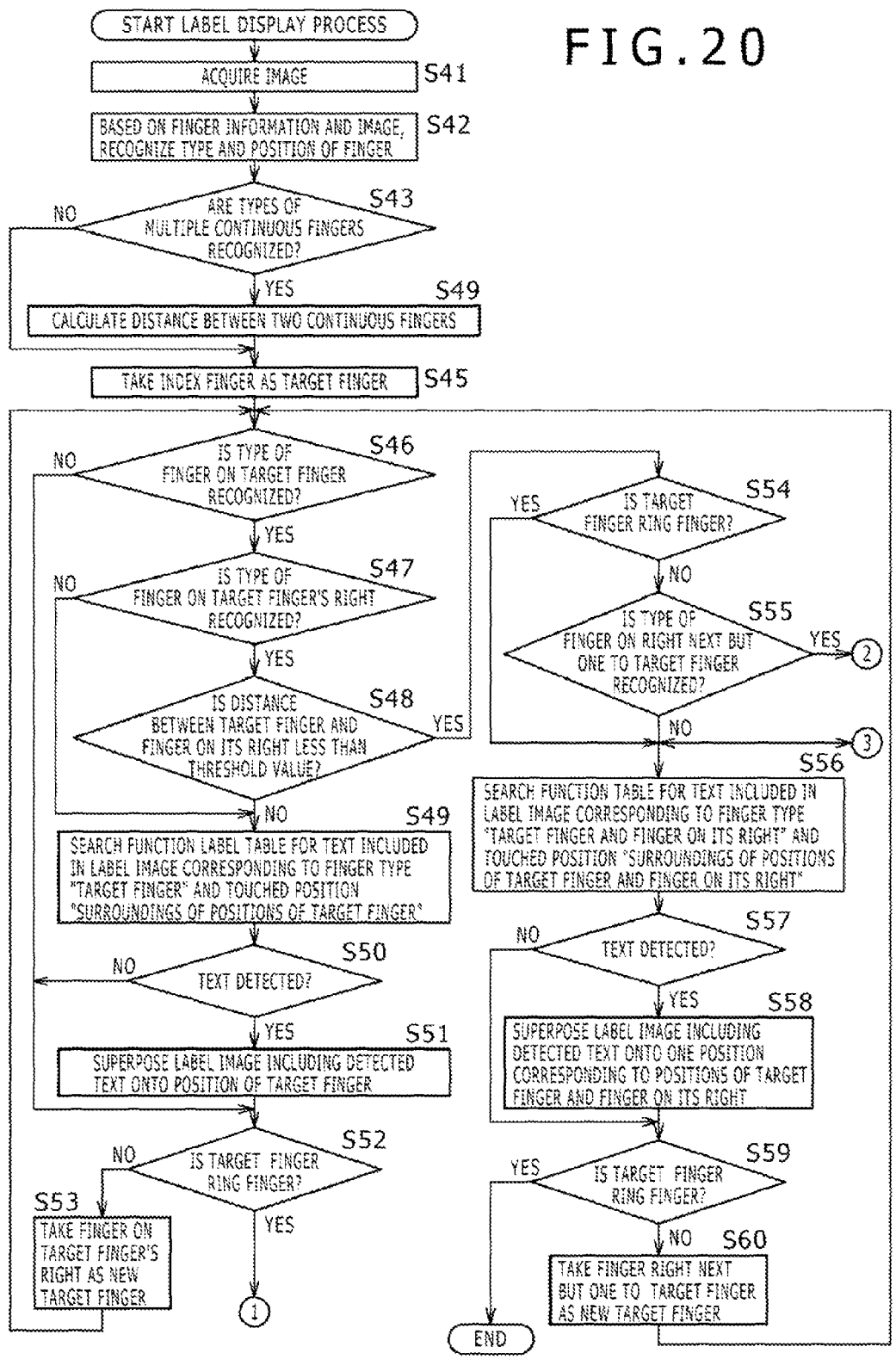
FIG. 20 is a flowchart explanatory of a label display process performed by the function execution processing section of FIG. 17.
Figure 21:
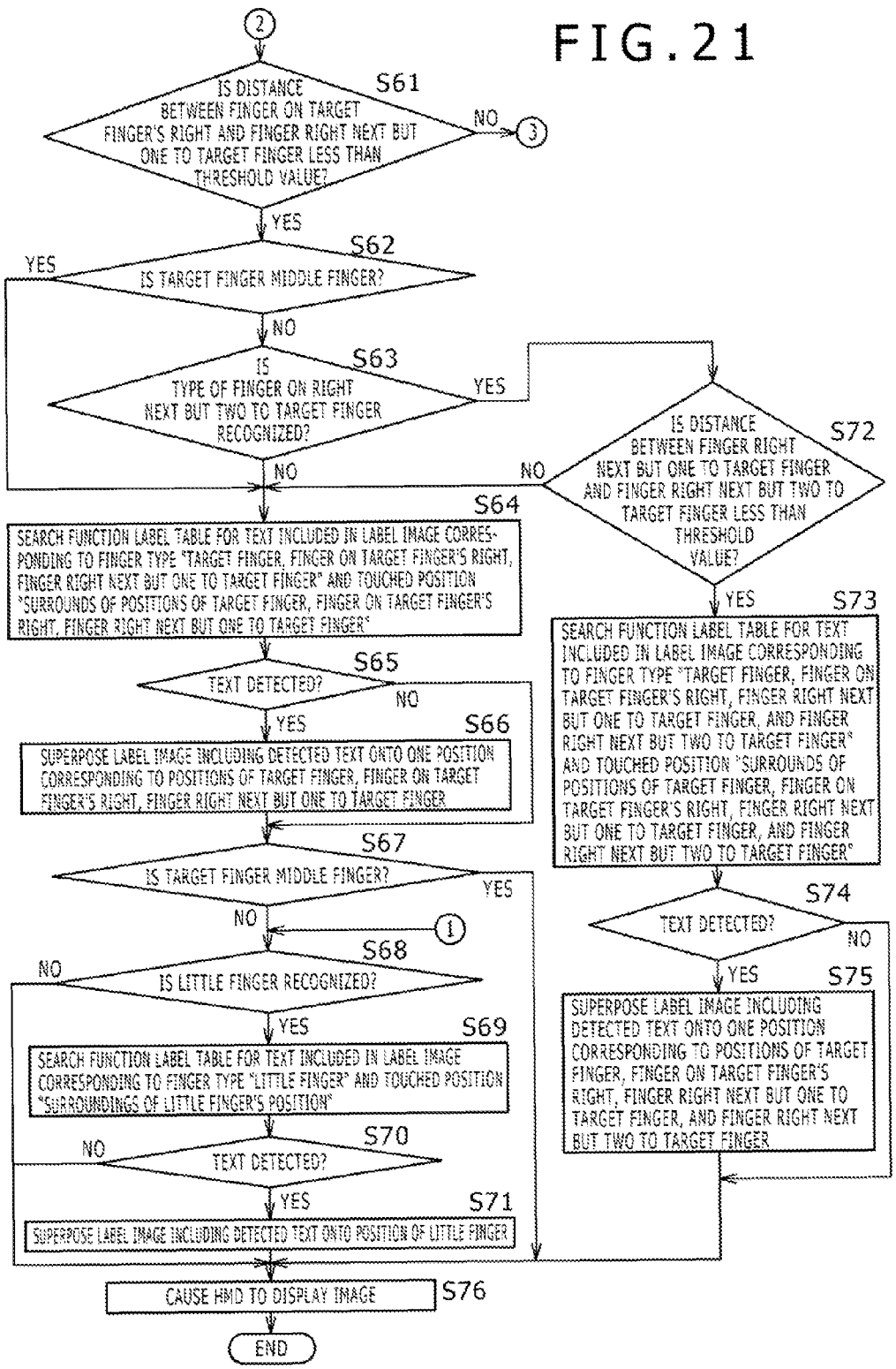
FIG. 21 is a flowchart explanatory of the label display process continued from the flowchart of FIG. 20.

FIGS. 20 and 21 are flowcharts explanatory of the label display process performed by the function execution processing section 180.

In step S41, the finger type recognition section 141 acquires the image taken by and sent from the camera 32.

In step S42, based on the finger information 92 stored beforehand in the storage section 68 and on the image acquired from the camera 32, the finger type recognition section 141 recognizes the type and position of the finger or fingers included in the image. The finger type recognition section 141 supplies the finger type and finger position thus recognized to the label display control section 182.

In step S43, based on the finger type or types fed from the finger type recognition section 141, the label display control section 182 determines whether the types of a plurality of contiguous fingers have been recognized. The types of the contiguous fingers are made up of "index finger and middle finger," "middle finger and ring finger," "ring finger and little finger," "index finger, middle finger and ring finger," "middle finger, ring finger and little finger," or "index finger, middle finger, ring finger and little finger."

If it is determined in step S43 that the types of a plurality of contiguous fingers have been recognized, then step S44 is reached. In step S44, the label display control section 182 calculates the distance between each two contiguous fingers based on the positions of the fingers and their types fed from the finger type recognition section 141. More specifically, the label display control section 182 calculates the distance between the index finger and the middle finger, between the middle finger and the ring finger, or between the ring finger and the little finger. Control is then transferred to step S45.

If it is determined in step S43 that the types of a plurality of contiguous fingers are not recognized, i.e., that what is recognized is only one of the fingers, the index finger along with the ring finger, the index finger along with the little finger, or the middle finger along with the little finger, then control is transferred to step S45.

In step S45, the label display control section 182 takes the index finger as the target finger to be processed.

In step S46, the label display control section 182 determines whether the type of the target finger has been recognized by the finger type recognition section 141, i.e., whether the type of the target finger is supplied from the finger type recognition section 141.

If it is determined in step S46 that the type, of the target finger has been recognized, then step S47 is reached. In step S47, the label display control section 182 determines whether the type of the finger on the target finger's right is recognized by the finger type recognition section 141. More specifically, if the target finger is the index finger, the label display control section 182 determines whether the middle finger is recognized. If the target finger is the middle finger, the label display control section 182 determines whether the ring finger is recognized. If the target finger is the ring finger, the label display control section 182 determines whether the little finger is recognized.

If it is determined in step S47 that the type of the finger on the target finger's right is recognized, then step S48 is reached. In step S48, the label display control section 182 determines whether the distance calculated in step S44 between the target finger and the finger on the target finger's right is less than a threshold value.

If it is determined in step S48 that the distance between the target finger and the finger on the target finger's right is not less than the threshold value, then the label display control section 182 determines that the target finger and the finger on the target finger's right are not joined. In this case, control is transferred to step S49.

If it is determined in step S47 that the finger on the target finger's right is not recognized, then control is transferred to step S49.

In step S49, the label display control section 182 searches the function label table 170 for the text included in the label image corresponding to the finger type "target finger" and to the touched position "surroundings of the target finger's position." That is, if the type of the target finger is recognized but the type of the finger on the target finger's right is not recognized, or if the type of the target finger and that of the finger on the target finger's right are both recognized but the target finger and the finger on the target finger's right are not joined, the function label table 170 is searched for the text included in the label image corresponding to the finger type "target finger" and to the touched position "surroundings of the target finger's position."

In step S50, the label display control section 182 determines whether the text included in the label image corresponding to the finger type "target finger" and to the touched position "surroundings of the target finger's position" is detected from the search through the function label table 170.

If it is determined in step S50 that the text in question is detected, then the label display control section 182 generates the label image including the detected text, and transfers control Co step S51.

In step S51, the label display control section 182 superposes the label image including the detected text onto the position of the target finger in the image sent from the camera 32. Control is then transferred to step S52.

If it is determined in step S50 that the text in question is not detected, i.e., that the text included in the label image corresponding to the finger type "target finger" and to the touched position "surroundings of the target finger's position" is not found in the function label table 170, then control is transferred to step S52.

If it is determined in step S46 that the type of the target finger is not recognized by the finger type recognition section 141, then control is also transferred to step S52.

In step S52, the label display control section 182 determines whether the target finger is the ring finger. If it is determined in step S52 that the target finger is not the ring finger, then step S53 is reached. In step S53, the label display control section 182 takes the finger on the current target finger's right as the new target finger, and transfers control back to step S46.

When steps S45 through S53 are carried out as described above, the position of the index finger alongside the middle finger separated from the index finger, the position of the middle finger alongside the index finger and ring finger both separated from the middle finger, and the position of the ring finger alongside the middle finger and little finger both separated from the ring finger are each superposed with the label image of the function assigned to the position and type of the finger in question.

If it is determined in step S52 that the target finger is the ring finger, then control is transferred to step S68 of FIG. 21.

If it is determined in step S48 that the distance between the target finger and the finger on the target finger's right is less than the threshold value, the label display control section 182 determines that the target finger and the finger on the target finger's right are joined with one another. In this case, control is transferred to step S54.

In step S54, the label display control section 182 determines whether the target finger is the ring finger. If it is determined in step S54 that the target finger is not the ring finger, i.e., that the target finger is either the index finger or the middle finger, then control is transferred to step S55.

In step S55, the label display control section 182 determines whether the type of the finger on the right next but one to the target finger is recognized by the finger type recognition section 141. If the target finger is the index finger, the finger on the right next but one to the target finger is the ring finger; if the target finger is the middle finger, the finger on the right next but one to the target finger is the little finger.

If it is determined in step S55 that the type of the finger on the right next but one to the target finger is recognized, then step S61 of FIG. 21 is reached. In step S61, the label display control section 182 determines whether the distance between the finger on the target finger's right and the finger on the right next but one to the target finger is less than a threshold value. More specifically, if the target finger is the index finger, the label display control section 182 determines whether the distance calculated in step S44 between the middle finger and the ring finger is less than the threshold value. If the target finger is the middle finger, the label display control section 182 determines whether the distance calculated in step S44 between the ring finger and the little finger is less than the threshold value.

If it is determined in step S61 that the distance between the finger on the target finger's right and the finger on the right next but one to the target finger is not less than the threshold value, the label display control section 182 determines that the finger on the target finger's right and the finger on the right next but one to the target finger are separated from each other. The label display control section 182 then transfers control to step S56 in FIG. 20.

If it is determined in step S54 that the target finger is the ring finger, or if it is determined in step S55 that the type of the finger on the right next but one to the target finger is not recognized, then control is transferred to step S56.

In step S56, the label display control section 182 searches the function label table 170 for the text included in the label image corresponding to the finger type "target finger and the finger on the target finger's right" and to the touched position "surroundings of the position of the target finger and of the finger on the target finger's right."

In step S57, it is determined whether the text included in the label image corresponding to the finger type "target finger and the finger on the target finger's right" and to the touched position "surroundings of the position of the target finger and of the finger on the target finger's right" is detected from the search.

If it is determined in step S57 that the text in question is detected, the label display control section 182 generates the label image including the detected text, and transfers control to step S58.

In step S58, the label display control section 182 superposes the label image including the detected text onto one position corresponding to the target finger and to the finger on the right next but one to the target finger in the image sent from the camera 32. Control is then transferred to step S59.

If it is determined in step S57 that the text in question is not detected from the search, control is transferred to step S59.

In step S59, the label display control section 182 determines whether the target finger is the ring finger. If it is determined that the target finger is the ring finger, then the label display process is brought to an end.

If it is determined in step S59 that the target finger is not the ring finger, then step S60 is reached. In step S60, the label display control section 182 takes the finger on the right next but one to the current target finger as the new target finger, and transfers control back to step S46.

When steps S54 through S61 are carried out as described above, one position corresponding to the positions of two joined fingers "index finger joined by the middle finger only," "middle finger joined by the ring finger only," or "ring finger joined by the little finger only" is superposed with the label image of the function assigned to the surroundings of that position and to the types of the two joined fingers.

If it is determined in step S61 of FIG. 21 that the distance between the finger on the target finger's right and the finger on the right next but one to the target finger is less than the threshold value, the label display control section 182 determines that the finger on the target finger's right and the finger on the right next but one to the target finger are joined. In this case, control is transferred to step S62.

In step S62, the label display control section 182 determines whether the target finger is the middle finger. If it is determined in step S62 that the target finger is not the middle finger, i.e., that the target finger is the index finger, then control is transferred to step S63.

In step S63, the label display control section 182 determines whether the finger on the right next but one to the target finger is recognized, i.e., whether the little finger is recognized.

If it is determined in step S63 that the finger on the right next but one to the target finger is recognized, then step S72 is reached. In step S72, the label display control section 182 determines whether the distance between the finger on the right next but one to the target finger and the finger on the right next but two to the target finger is less than the threshold value. That is, the label display control section 182 determines whether the distance calculated in step S44 of FIG. 20 between the ring finger and the little finger is less than the threshold value.

If it is determined in step S72 that the distance between the finger on the right next but one to the target finger and the finger on the right next but two to the target finger is not less than the threshold value, the label display control section 182 determines that the ring finger and the little finger are separated from each other. In this case, control is transferred to step S64.

If it is determined in step S62 that the target finger is the middle finger, or if it is determined in step S63 that the type of the finger on the right next but two to the target finger is not recognized, then control is transferred to step S64.

In step S64, the label display control section 182 searches the function label table 170 for the text included in the label image corresponding to the finger types "target finger, the finger on the target finger's right, and the finger on the right next but one to the target finger" and to the touched positions "surroundings of the positions of the target finger, the finger on the target finger's right, and the finger on the right next but one to the target finger."

In step S65, the label display control section 182 determines whether the text included in the label image corresponding to the finger types "target finger, the finger on the target finger's right, and the finger on the right next but one to the target finger" and to the touched positions "surroundings of the positions of the target finger, the finger on the target finger's right, and the finger on the right next but one to the target finger" is detected from the search.

If it is determined in step S65 that the text in question is detected from the search, the label display control section 182 generates the label image including the detected text, and transfers control to step S66.

In step S66, the label display control section 182 superposes the label image including the detected text onto one position corresponding to the positions of the target finger, the finger on the target finger's right, and the finger on the right next but one to the target finger. Control is then transferred to step S67.

If it is determined in step S65 that the text in question is not detected from the search, then control is transferred to step S67.

When steps S61 through S66 and step S72 are carried out as described above, one position corresponding to the positions of three joined fingers "the index finger, the middle finger, and the ring finger joined together apart from the little finger" or "the middle finger, the ring finger, and the little finger joined together apart from the index finger" is superposed with the label image of the function assigned to the surroundings of the positions of the three joined fingers and to their types.

In step S67, the label display control section 182 determines whether the target finger is the middle finger. If it is determined in step S67 that the target finger is the middle finger, control is transferred to step S76. If it is determined in step S64 that the target finger is not the middle finger, i.e., that the target finger is the index finger, then control is transferred to step S68.

In step S68, the label display control section 182 determines whether the little finger is recognized as the finger type by the finger type recognition section 141.

If it is determined in step S69 that the little finger is recognized, then step S69 is reached. In step S69, the label display control section 182 searches the function label table 170 for the text included in the label image corresponding to the finger type "little finger" and to the touched position "surroundings of the little finger's position."

In step S70, the label display control section 182 determines whether the text included in the label image corresponding to the finger type "little finger" and to the touched position "surroundings of the little finger's position" is detected from the search.

If it is determined in step S70 that the text in question is detected form the search, the label display control section 182 generates the label image including the detected text, and transfers control to step S71.

In step S71, the label display control section 182 superposes the label image including the detected text onto the position of the little finger in the image sent from the camera 32. Control is then transferred to step S76.

If it is determined in step S68 that the little finger is not recognized, or if it is determined in step S70 that the text in question is not detected from the search, then control is transferred to step S76.

When steps S68 through S71 are carried out as described above, the position of the little finger separated from the ring finger is superposed with the label image of the function assigned to the surroundings of the little finger's position and to the finger type "little finger."

If it is determined in step S72 that the distance between the finger on the right next but one to the target finger and the finger on the right next but two to the target finger is less than the threshold value, the label display control section 182 determines that the ring finger and the little finger are joined. In this case, control is transferred to step S73.

In step S73, the label display control section 182 searches the function label table 170 for the text included in the label image corresponding to the finger types "target finger, the finger on the target finger's right, the finger on the right next but one to the target finger, and the finger on the right next but two to the target finger" and to the touched position "surroundings of the positions of the target finger, the finger on the target finger's right, the finger on the right next but one to the target finger, and the finger on the right next but two to the target finger." That is, the label display control section 182 searches the function label table 170 for the text included in the label image corresponding to the finger types "index finger, middle finger, ring finger, and little finger" and to the touched position "surroundings of the positions of the index finger, middle finger, ring finger, and little finger."

In step S74, it is determined whether the text included in the label image corresponding to the finger types "target finger, the finger on the target finger's right, the finger on the right next but one to the target finger, and the finger on the right next but two to the target finger" and to the touched position "surroundings of the positions of the target finger, the finger on the target finger's right, the finger on the right next but one to the target finger, and the finger on the right next but two to the target finger" is detected from the search.

If it is determined in step S74 that the text in question is detected from the search, the label display control section 182 generates the label image including the detected text, and transfers control to step S75.

In step S75, the label display control section 182 superposes the label image including the detected text onto one position corresponding to the positions of the target finger, the finger on the target finger's right, the finger on the right next but one to the target finger, and the finger on the right next but two to the target finger. Control is then transferred to step S76.

When steps S72 through S75 are carried out as described above, one position corresponding to the positions of the index finger, middle finger, ring finger and little finger joined together is superposed with the label image of the function assigned to the surroundings of the positions of these fingers and to the finger types "index finger, middle finger, ring finger and little finger."

If it is determined in step S74 that the text in question is not detected from the search, then control is transferred to step S76.

In step S76, the label display control section 182 controls the communication section 132 to transmit either the image sent from the camera 32 and not superposed with the label image resulting from the above steps or the image fed from the camera 32 and superposed with the resultant label image to the HMD 122 for display. This brings the label display process to an end.

As described above, the information processing apparatus 121 in FIG. 16 assigns the functions to the combinations of the touched position of one or more fingers and their types. Compared with ordinary setups in which the functions are assigned to the combinations of the touched position of a single finger and its type, the inventive arrangement allows more functions to be assigned to the single action of touching a relevant position with fingertips.

Also in the information processing apparatus 121 of FIG. 16, a single position corresponding to the positions of a plurality of fingers joined together is superposed with the label image of the function corresponding to the surroundings of the positions of these fingers and to their types. This arrangement provides better visibility than ordinary setups in which the position of each finger is superposed with the label image.

The function execution process performed by the function execution processing section 180 is the same as the function execution process explained above in reference to FIG. 9 except that it is determined whether a plurality of fingers touching the panel are joined together and that if the plurality of fingers are found to be joined together, the target to be detected from the search in the process of FIG. 9 is replaced by the function corresponding to the types of the multiple joined fingers and to their touched positions on the panel. Thus further illustrations of the function execution process carried out by the function execution processing section 180 are omitted from the accompanying drawings.

Third Embodiment

Figure 22:
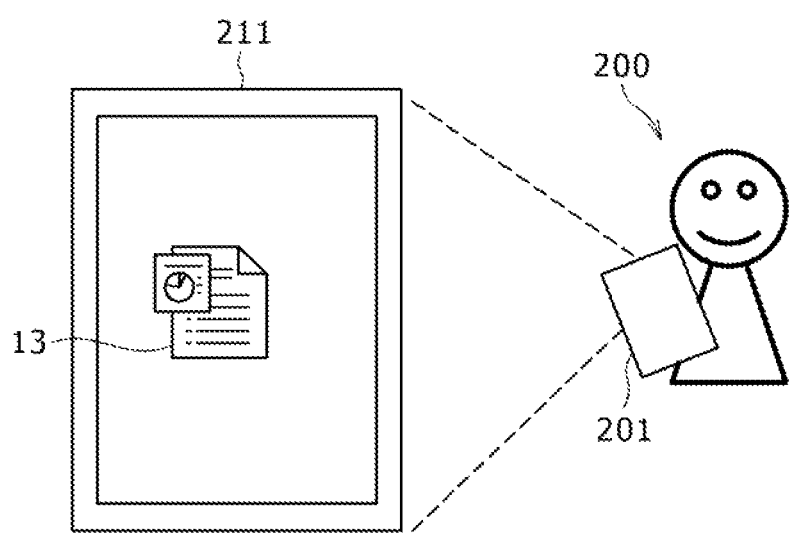
FIG. 22 is a schematic view showing a typical configuration of an information processing system as a third embodiment of the present invention.

Typical Configuration of the Information Processing System as the Third Embodiment FIG. 22 is a schematic view showing a typical configuration of an information processing system as the third embodiment of the present invention.

In FIG. 22, those components already shown in FIG. 4 are designated by the same reference numerals, and their descriptions will be omitted hereunder where redundant.

The configuration of an information processing system 200 in FIG. 22 is different from the configuration in FIG. 4 primarily on the following two points: that the information processing apparatus 31 is replaced by an information processing apparatus 201, and that the goggles 33 equipped with the camera 32 are omitted. The information processing apparatus 201 is furnished with the imaging facility provided by the camera 32 shown in FIGS. 4 and 10, so that when making use of the information processing system 200, the user need only hold the information processing apparatus 201.

In the information processing system 200, the information processing apparatus 201 is an apparatus that can be operated by touch with fingertips and includes a touch panel monitor 211 or the like. The touch panel monitor 211 has the imaging function and display function. By taking images of the touch panel monitor 211 or the like with its imaging function, the touch panel monitor 211 detects the type and position of the finger or fingers touching the panel. Using its display function, the touch panel monitor 211 displays the icon 13 or the like. The touch panel monitor 211 will be explained later in detail by reference to FIG. 24.

By looking at the icon 13 or the like displayed on the touch panel monitor 211, the user touches the relevant position on the panel with his or her fingertips in order to execute a desired function. More specifically, based on the image taken by the touch panel monitor 211, the information processing apparatus 201 recognizes the position and type of the finger touching the touch panel monitor 211. The information processing apparatus 201 then executes the function assigned to the position and type of the finger in question.

[Typical Hardware Structure of the Information Processing Apparatus]

Figure 23:
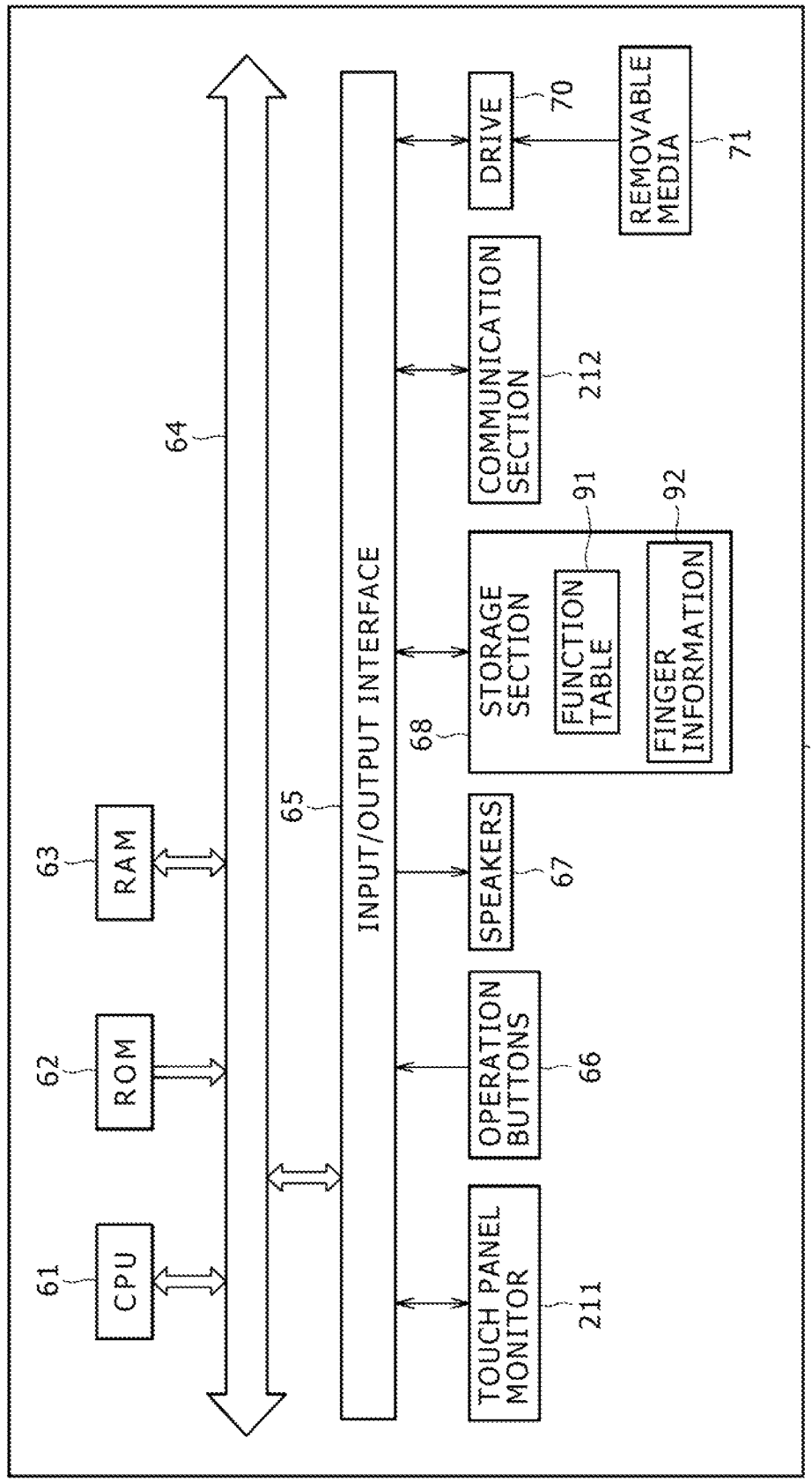
FIG. 23 is a block diagram showing a typical hardware structure of an information processing apparatus included in FIG. 22.

FIG. 23 is a block diagram showing a typical hardware structure of the information processing apparatus 201 included in FIG. 22.

In FIG. 23, those components already shown in FIG. 5 are designated by the same reference numerals, and their descriptions will be omitted hereunder where redundant.

The structure of the information processing apparatus 201 in FIG. 23 is different from the structure in FIG. 5 primarily on the following two points: that the touch panel monitor 41 is replaced by a touch panel monitor 211 and that the communication section 69 is replaced by a communication section 212.

The touch panel monitor 211 takes an image including the touch panel monitor 211 and displays the image thus taken. The communication section 212 communicates with external devices, not shown.

[Typical Detailed Structure of the Touch Panel Monitor]

Figure 24:
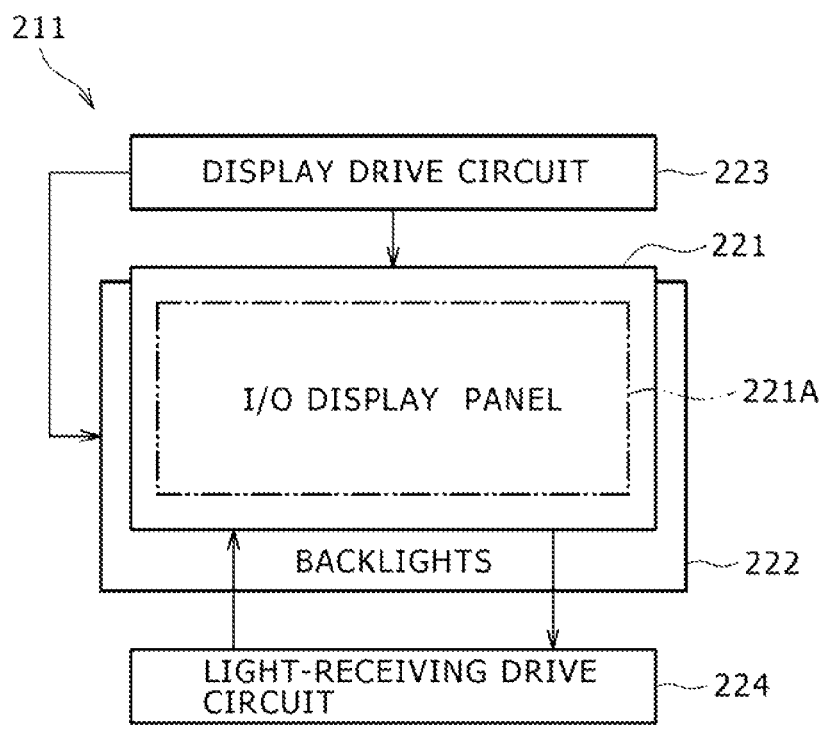
FIG. 24 is a block diagram showing a typical detailed structure of a touch panel monitor included in the structure of FIG. 22.

FIG. 24 is a block diagram showing a typical detailed structure of the touch panel monitor 211.

As shown in FIG. 24, the touch panel monitor 211 is made up of an I/O display panel 221, backlights 222, a display drive circuit 223, and a light-receiving drive circuit 224.

The I/O display panel 221 is an LCD in which circuits corresponding to a plurality of pixels are arrayed in matrix form to constitute a display area 221A at the center of the panel. The circuit corresponding to each pixel is constituted by a pixel part composed of a TFT (thin film transistor) and of electrodes flanking liquid crystal and by a sensor part made up of an optical sensor, a reset switch, a capacitor, etc., formed by the same layer as the TFT.

Under control of the display drive circuit 223, the pixel part of each pixel in the I/O display panel 221 performs line-sequential operations to display the image from the CPU 61 or the like on the display area 221A. Also, under control of the light-receiving drive circuit 224, the sensor part of each pixel in the I/O display panel 221 performs line-sequential operations to acquire light-receiving data. That is, the pixel parts of the I/O display panel 221 display images and the sensor parts thereon take images.

The backlights 222 serve as light sources for the I/O display panel 221. For example, the backlights 222 are formed by a plurality of light-emitting diodes arrayed within the panel. The backlights 222 turn on and off the light-emitting diodes at high speed in synchronism with a signal which is fed from the display drive circuit 223 and which represents the operation timing of the I/O display panel 221. The backlights 222 emit two kinds of light: visible light for displaying images, and ultraviolet light for taking images.

Based on the image fed from the CPU 61 or the like, the display drive circuit 223 causes the I/O display panel 221 to perform line-sequential operations in order to display the image in question on the display area 221A. Also, the display drive circuit 223 supplies the signal representing the timing of the line-sequential operations to the backlights 222.

The light-receiving drive circuit 224 causes the I/O display panel 221 to perform line-sequential operations in order to take images. Also, the light-receiving drive circuit 224 supplies the CPU 61 with the image composed of the light-receiving data of each pixel acquired as a result of the imaging.

Incidentally, more detailed explanations of the touch panel monitor 211 are found in Japanese Patent Laid-open No. 2009-63803 filed earlier by this applicant.

(Typical Functional Structure of the Information Processing Apparatus)

Figure 25:
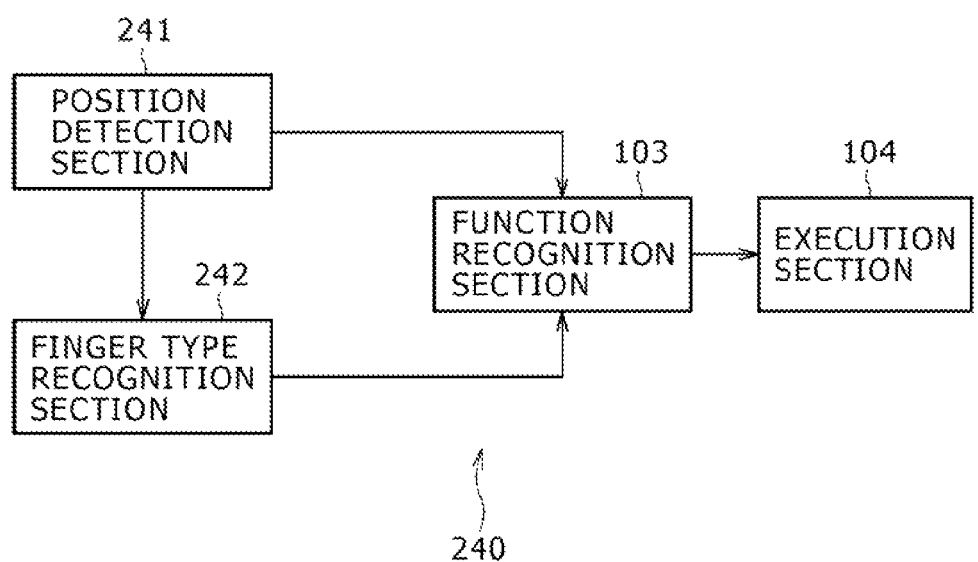
FIG. 25 is a block diagram showing a typical functional structure of a function execution processing section implemented by a CPU included in the structure of FIG. 23.

FIG. 25 is a block diagram showing a typical functional structure of a function execution processing section implemented by the CPU 61 of the information processing apparatus 201.

The structure of a function execution processing section 240 is different from the structure in FIG. 6 primarily on the following two points: that the position acquisition section 101 is replaced by a position detection section 241 (detection means) and that the finger type recognition section 102 is replaced by a finger type recognition section 242.

The position detection section 241 detects the position of an object touching the touch panel monitor 211 as the touched position, typically on the basis of the size in pixel values of the image fed from the touch panel monitor 211. The position detection section 241 supplies the touched position thus detected to the function recognition section 103 and finger type recognition section 242.

The finger type recognition section 242 recognizes the type of the finger touching the touch panel monitor 211 based on the image supplied from the touch panel monitor 211, on the finger information 92 stored beforehand in the storage section 68, and on the touched position from the position detection section 241. The finger type recognition section 242 feeds the recognized finger type to the function recognition section 103.

[Explanation of a Process Performed by the Information Processing Apparatus]

Figure 26:
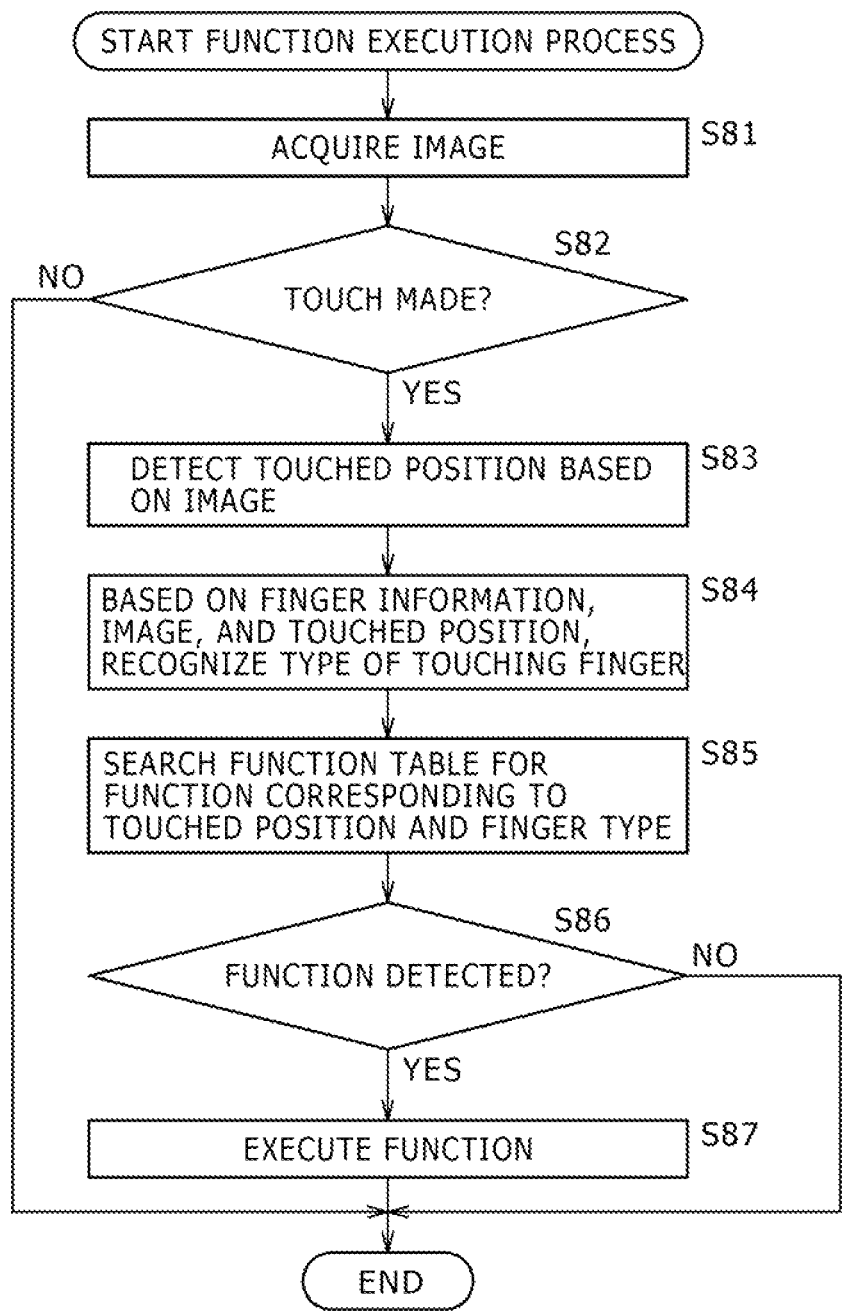
FIG. 26 is a flowchart explanatory of a function execution process performed by the function execution processing section of FIG. 25.

FIG. 26 is a flowchart explanatory of the function execution process performed by the function execution processing section 240.

In step S81 of FIG. 26, the position detection section 241 acquires the image supplied from the touch panel monitor 211.

In step S82, the position detection section 241 determines whether an object is touching the touch panel monitor 211, typically on the basis of the size in pixel values of the image fed from the touch panel monitor 211.

If it is determined in step S82 that an object is touching the touch panel monitor 211, then control is transferred to step S83.

In step S83, the position detection section 241 detects the position of the object touching the touch panel monitor 211 as the touched position, typically on the basis of the size in pixel values of the image from the touch panel monitor 211. The position detection section 241 sends the touched position to the function recognition section 103 and finger type recognition section 242.

In step S84, the finger type recognition section 242 recognizes the type of the finger touching the touch panel monitor 211, based on the finger information 92, on the image from the touch panel monitor 211, and on the touched position from the position detection section 241. The finger type recognition section 242 supplies the recognized finger type to the function recognition section 103.

Steps S85 through S87 are the same as steps S15 through S17 in FIG. 9 and thus will not be discussed further.

If it is determined in step S82 that no object is touching the touch panel monitor 211, then the function execution process is brought to an end.

(Other Examples of the Finger Information)

Figure 27:
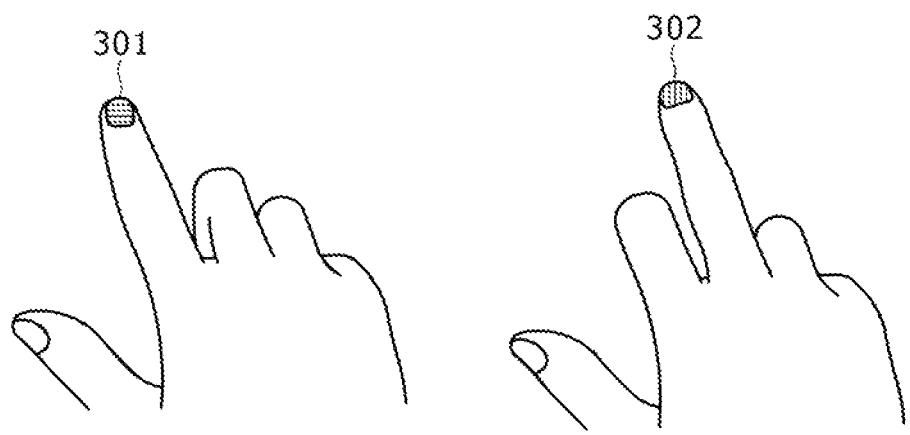
FIG. 27 is a schematic view explanatory of finger information.
Figure 28:
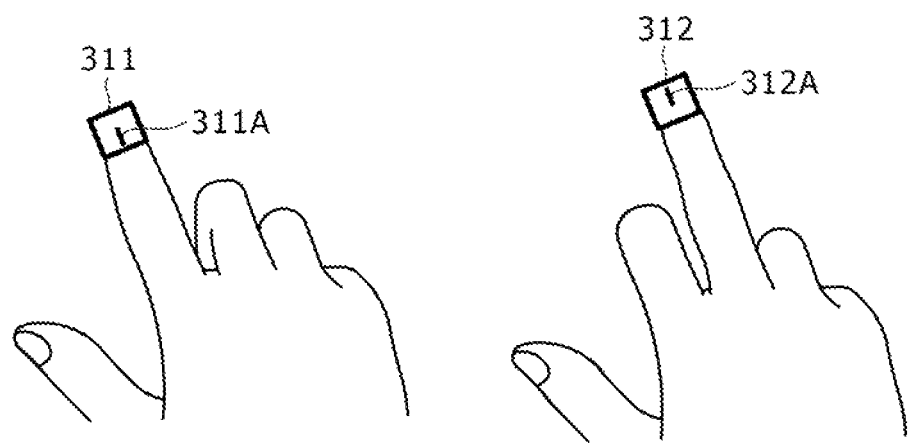
FIG. 28 is a schematic view explanatory of other finger information.

FIGS. 27 and 28 are schematic views explanatory of other examples of the finger information 92.

In the foregoing description, the finger information 92 was shown to be the image of each finger or the information for identifying the shape of each finger. Alternatively, as indicated in FIG. 27, the user may have his or her fingers painted with unique colors on desired locations (nails in the example of FIG. 27). In such a case, the color information may be used as the finger information 92.

More specifically, in the example of FIG. 27, the user has the nail of his or her index finger painted with a color 301 different from a color 302 painted on the nail of the middle finger. In this case, the information processing apparatus 31 (120, 201) establishes correspondences between the color 301 and the finger type "index finger" and between the color 302 and the finger type "middle finger," and stores a table of these correspondences as the finger information 92. Then the information processing apparatus 31 (121, 201) may recognize the finger type by searching the finger information 92 for the type of the finger corresponding to the color of the image taken by the camera 32 (touch panel monitor 211).

Also, as shown in FIG. 28, the user may have his or her fingers pasted with markers such as pieces of paper on desired locations (nails in the example of FIG. 28), each of the markers having a uniquely positioned marking drawn thereon. In such a case, the information denoting the positions of the markings on the markers may be used as the finger information 92.

More specifically, in the example of FIG. 28, the user has the nail of his or her index finger pasted with a marker 311 having a marking 311A drawn at the bottom center thereon, and has the nail of his or her middle finger pasted with a marker 312 having a marking 312A drawn at the top center thereon. In this case, the information processing apparatus 31 (121, 201) establishes correspondences between the position "bottom center" of the marking 311A on the marker 311 and the finger type "index finger," and between the position "top center" of the marking 312A on the marker 312 and the finger type "middle finger," and stores a table of these correspondences as the finger information 92. Then the information processing apparatus 31 (121, 201) may extract the marker 311 (312) from the image taken by the camera 32 (touch panel monitor 211) and recognize the finger type by searching the finger information 92 for the type of the finger corresponding to the position of the marking 311A (312A) on the extracted marker 311 (312).

The finger information 92 explained above in connection with FIGS. 27 and 28 may be established beforehand or may be set later by the user.

The function table 91 and function label table 131 (170) may be established by the user. In this case, the user is allowed to customize the functions to be assigned to the combinations of the types of fingers with their touched positions.

In this specification, the steps or processes performed by a computer in accordance with relevant programs need not proceed in the depicted sequence in the flowcharts (i.e., on a time series basis). That is, such steps or processes may also include steps or processes that are conducted parallelly or individually (e.g., in parallel or object-oriented fashion).

The programs may be processed by a single computer or by a plurality of computers on a distributed basis. The program may also be transferred to a remote computer or computers for execution.

In this specification, the term "system" refers to an entire configuration made up of a plurality of component devices or apparatuses.

It should be understood by those skilled in the art that various modifications, combinations, sub-combinations and alterations may occur depending on design requirements and other factor in so far as they are within the scope of the appended claims or the equivalents thereof.

The present application contains subject matter related to that disclosed in Japanese Priority Patent Application JP 2010-044611 filed in the Japan Patent Office on Mar. 1, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
a detection unit to detect a position of an object touching a touch-sensitive part as a touched position;
a recognition unit to recognize a type of at least one finger touching said touch-sensitive part based on said touched position and on an image of said touch-sensitive part;
a search unit to search through a function table defining a correspondence between the touched position of at least one finger and the type thereof on the one hand and a function assigned to the combination of the touched position and the type of the at least one finger on the other hand, said search unit searching said function table for the function corresponding to said touched position detected by said detection unit and to the finger type detected by said recognition unit,
wherein:
different functions are assigned to the same touched position depending on the detected type of the at least one finger touching the same touched position,
the detected same finger type corresponds to a same function out of the different functions assigned to the same touched position,
upon determining that multiple fingers are placed joined with each other onto said touch-sensitive part, a same function is assigned to the joined multiple fingers, and
upon determining that the multiple fingers are placed separated from each other onto said touch-sensitive part, a unique and different function is assigned to each of the multiple fingers;
a display control unit to display an image of function information representative of the assigned function at a position corresponding to the at least one finger so that the image of function information overlaps the at least one finger; and an execution unit for executing said function detected through the search by said search unit.

2. The information processing apparatus according to claim 1, wherein said detection unit senses said object touching said touch-sensitive part to detect the position of the touch as said touched position.

3. The information processing apparatus according to claim 1, wherein said detection unit detects said touched position based on said image of said touch-sensitive part.

4. The information processing apparatus according to claim 1, wherein said function table defines correspondences among the touched position and type of at least one finger, the function assigned to the combination of the touched position and the finger type, and function information representative of the assigned function;

said recognition unit recognizes the type and the position of the finger disposed on said touch-sensitive part based on said image of said touch-sensitive part; and said display control unit searches said function table for the function information corresponding to surroundings of the finger position and said finger type recognized by said recognition unit, said display control unit further superposing an image of said function information onto said finger position in said image of said touch-sensitive part.

5. The information processing apparatus according to claim 4, wherein, if a plurality of fingers are jointly disposed on said touch-sensitive part, said display control unit searches said function table for the function information corresponding to surroundings of the positions of said plurality of fingers and to the types thereof, said display control unit further superposing an image of said function information onto one position corresponding to the positions of said plurality of fingers in said image of said touch-sensitive part.

6. An information processing method for use with an information processing apparatus having a touch-sensitive part, said information processing method comprising the steps of:

detecting a position of an object touching said touch-sensitive part as a touched position;

recognizing a type of at least one finger touching said touch-sensitive part based on said touched position and on an image of said touch-sensitive part;

searching through a function table defining a correspondence between the touched position of at least one finger and the type thereof on the one hand and a function assigned to the combination of the touched position and the type of the at least one finger on the other hand, said function table being searched for the function corresponding to said touched position detected in said detecting step and to the finger type detected in said recognizing step, wherein:

different functions are assigned to the same touched position depending on the detected type of the finger touching the same touched position, the detected same finger type corresponds to a same function out of the different functions assigned to the same touched position, upon determining that multiple fingers are placed joined with each other onto said touch-sensitive part, a same function is assigned to the joined multiple fingers, and upon determining that the multiple fingers are placed separated from each other onto said touch-sensitive part, a unique and different function is assigned to each of the multiple fingers;

displaying an image of function information representative of the assigned function at a position corresponding to the at least one finger so that the image of function information overlaps the at least one finger; and executing said function detected through the search in said searching step.

7. A non-transitory computer readable medium storing a program for causing a computer to execute a procedure comprising the steps of:

detecting a position of an object touching a touch-sensitive part as a touched position;

recognizing a type of at least one finger touching said touch-sensitive part based on said touched position and on an image of said touch-sensitive part;

searching through a function table defining a correspondence between the touched position of at least one finger and the type thereof on the one hand and a function assigned to the combination of the touched position and the type of the at least one finger on the other hand, said function table being searched for the function corresponding to said touched position detected in said detecting step and to the finger type detected in said recognizing step, wherein:

different functions are assigned to the same touched position depending on the detected type of the finger touching the same touched position, the detected same finger type corresponds to a same function out of the different functions assigned to the same touched position, upon determining that multiple fingers are placed joined with each other onto said touch-sensitive part, a same function is assigned to the joined multiple fingers, and upon determining that the multiple fingers are placed separated from each other onto said touch-sensitive part, a unique and different function is assigned to each of the multiple fingers;

displaying an image of function information representative of the assigned function at a position corresponding to the at least one finger so that the image of function information overlaps the at least one finger; and executing said function detected through the search in said searching step.

8. An information processing apparatus comprising:

a detection section to detect a position of an object touching a touch-sensitive part as a touched position;

a recognition section to recognize a type of at least one finger touching said touch-sensitive part based on said touched position and on an image of said touch-sensitive part;

a search section to search through a function table defining a correspondence between the touched position of at least one finger and the type thereof on the one hand and a function assigned to the combination of the touched position and the type of the at least one finger on the other hand, said search section searching said function table for the function corresponding to said touched position detected by said detection section and to the finger type detected by said recognition section, wherein:

different functions are assigned to the same touched position depending on the detected type of the finger touching the same touched position, the detected same finger type corresponds to a same function out of the different functions assigned to the same touched position, upon determining that multiple fingers are placed joined with each other onto said touch-sensitive part, a same function is assigned to the joined multiple fingers, and upon determining that the multiple fingers are placed separated from each other onto said touch-sensitive part, a unique and different function is assigned to each of the multiple fingers;

a display control section to display an image of function information representative of the assigned function at a position corresponding to the at least one finger so that the image of function information overlaps the at least one finger; and an execution section to execute said function detected through the search by said search section.

* * * * *